United States Patent [19]

Kouno

[11] 4,418,242
[45] Nov. 29, 1983

[54] COORDINATE READING APPARATUS

[75] Inventor: Tsutom Kouno, Machida, Japan

[73] Assignee: Fujitsu Limited, Kanagawa, Japan

[21] Appl. No.: 238,961

[22] Filed: Feb. 27, 1981

[30] Foreign Application Priority Data

Mar. 4, 1980 [JP] Japan .................................. 55/27095
Apr. 15, 1980 [JP] Japan .................................. 55/49478
Apr. 15, 1980 [JP] Japan .................................. 55/49479
Dec. 11, 1980 [JP] Japan .................................. 55/173755

[51] Int. Cl.³ .......................................... G08C 21/00
[52] U.S. Cl. .......................................... 178/19; 178/18
[58] Field of Search .................................. 178/19, 18;
340/146.3 SY, 146.3 MA; 33/1 M; 346/139 C;
358/257

[56] References Cited

U.S. PATENT DOCUMENTS 3,819,857 6/1974 Inokuchi ............................... 178/19

Primary Examiner—Stafford D. Schreyer
Attorney, Agent, or Firm—Staas & Halsey

[57] ABSTRACT

A coordinate reading apparatus is disclosed, which is comprised of a tablet including therein magnetic-field generating coils; a position detector responsive to magnetic fields induced by the magnetic-field generating coils, for producing an analogue electric signal corresponding to a desired position to be read on the tablet; and a processing unit for receiving the analogue electric signal from the position detector and for producing coordinate data corresponding to the desired position to be read on the tablet. Above the tablet, many cylindrical rotating magnetic fields are formed and arranged along each coordinate axis. By supplying alternating signals to the magnetic-field generating coils, the phases of the alternating signals are shifted with respect to each other. The position detector detects the rotating magnetic-field vector comprising components in phase. The phase component of the vector is processed so that the coordinate data can be read by means of the processing unit.

15 Claims, 24 Drawing Figures

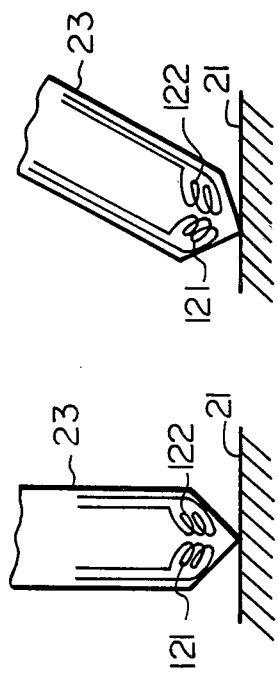
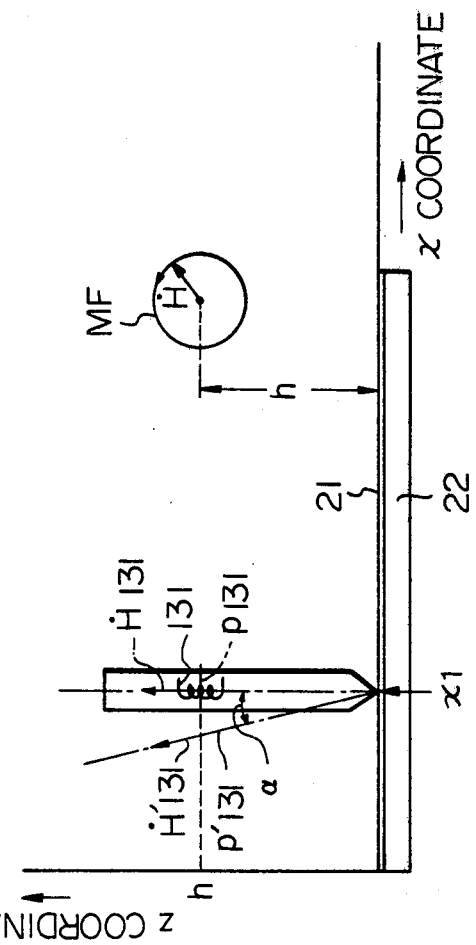
Fig.12A (PRIOR ART)
Fig.12B (PRIOR ART)
Fig.13

COORDINATE READING APPARATUS

BACKGROUND OF THE INVENTION

The present invention relates to a coordinate reading apparatus.

The coordinate reading apparatus, to which the present invention refers, comprises, at least, a tablet, a position detector which detects a specified position to be read and a processing apparatus which produces coordinate data with respect to the specified position. Such coordinate reading apparatus is useful as a graphic information processing system which is very important in the technical field of, for example, automatic design or automatic drawing.

According to the coordinate reading apparatus of the prior art, three kinds of methods have been proposed and put into practical use, for producing a signal which indicates relative location between the tablet and the position detector. First of the methods is a method based on an electrostatic coupling between the tablet and the position detector, second thereof is a method based on an electromagnetic induction therebetween, third thereof is a method based on an ohmic resistance obtained on the tablet. To be more specific, according to the first method which is based on the electrostatic coupling, alternating signals, corresponding to the coordinate values, are applied to the tablet, and each of the alternating signals is picked up via a dielectric layer, based on the electrostatic coupling, by means of a position detector. The "Sylvania Data Tablet" (explained hereinafter) is one example according to the first method. According to the second method, based on electromagnetic induction, pulse signals are applied from an object, for example a pen, and the pulse signals are picked up by a position detector located on the tablet. According to the third method, based on ohmic resistance, resistance wires are distributed on the tablet, and the resistance value of the resistance wire, corresponding to the coordinate values, is picked up by a position detector located on the tablet. The coordinate reading apparatus of the present invention is basically constructed according to the above mentioned electromagnetic induction method, however, it does not have the same construction as the above mentioned construction, based on the prior art electromagnetic induction method. That is, the coordinate reading apparatus of the present invention utilizes, as will be explained hereinafter, a rotating magnetic field.

In such a coordinate reading apparatus, there are two important conditions to be satisfied therein. The first condition is that the position detector must produce an analogue electric signal which is correctly proportional to each coordinate value with a high degree of accuracy. Second is that the analogue electric signal must be constant at any angle between a ball-pen type position detector and the tablet, when the detector is located at a desired coordinate position on the tablet. It should be noted that it is very difficult for an operator to stand the ball-pen type position detector always at right angles with respect to the tablet from an operational view point. Regarding a technique for satisfying the above-mentioned former condition, usually, the resolution of the coordinate of the tablet is increased so as to detect the desired coordinate value with a high degree of accuracy. However, the technique for increasing the resolution produces, on the other hand, a first defect in that since the increase of the resolution requires an increase in amount of hardware, this technique is not preferable from an economical view point. Regarding a technique for satisfying the above-mentioned latter condition, usually, a particular means for detecting a tilt angle of the position detector is employed, and the analogue electric signal, produced from the position detector, is compensated by a detected tilt angle signal from the particular means, in which the particular means and the position detector work as one body. However, the technique for employing the particular means produces, on the other hand, a second defect in that firstly the employment of such particular means is not preferable from an economical view point and secondly, it is not easy to achieve the compensation of the analogue electric signal, by the tilt angle signal, with a high degree of accuracy.

In order to overcome the above-mentioned first defect, according to the aforesaid "Sylvania Data Tablet," a concept called phase detection is taken into consideration. That is, the coordinate data is obtained by detecting a variation of the phase of the analogue electric signal produced from the position detector. According to this method, the coordinate reading can be achieved, with a high degree of resolution and without increasing the amount of hardware, by detecting a continuous variation of the phase of the analogue electric signal. However, according to the Sylvania Data Tablet, there exists a problem in that the analogue electric signal varies due to the presence of an external dielectric object including a human body, because the Sylvania Data Tablet is constructed by utilizing the electrostatic coupling method. Further, the Sylvania Data Tablet employs no means for overcoming the above-mentioned second defect. Furthermore, generally, a suitable means for overcoming such second defect, has not been previously proposed.

SUMMARY OF THE INVENTION

Therefore, it is an object of the present invention to provide a coordinate reading apparatus which can overcome the aforesaid defects and also resolve the aforesaid problem, although the coordinate reading apparatus is constructed by utilizing the conventional electromagnetic induction method and phase detecting method.

The present invention will be more apparent from the ensuing description with reference to the accompanying drawings.

BRIEF DESCRIPTION OF THE DRAWINGS

FIGS. 12A and 12B are diagrams of the prior art particular means for detecting the tilt angle of the position detector;

FIG. 13 is a diagram, used for explaining the fact that the prior art particular means is not necessary in the coordinate reading apparatus according to the present invention;

DESCRIPTION OF THE PREFERRED EMBODIMENT

Figure 1:
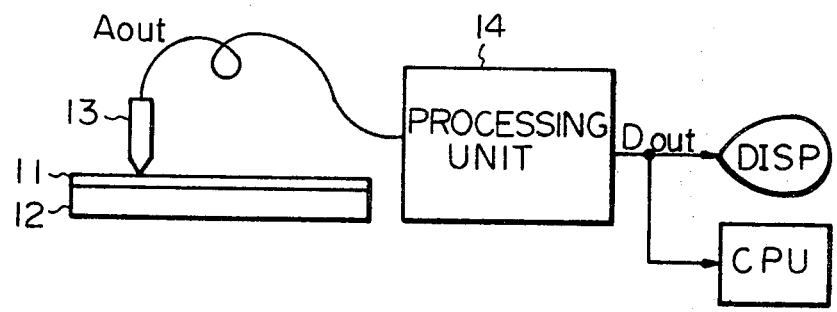
FIG. 1 is a block diagram illustrating an overall view of a typical coordinate reading apparatus.

FIG. 1 schematically illustrates an overall view of a typical coordinate reading apparatus. In FIG. 1, the reference numeral 11 is a tablet on which surface a coordinate is defined. In order to find coordinate data of a desired position, a ball-pen type position detector 13 is touched, at its edge, at the desired position by an operator. In this case, the tablet 11 is provided with an electric coupling means 12 as one body so that an electric coupling, between the position detector 13 and the coordinate, can be created. When the position detector 13 is located on the tablet 11, the detector 13 produces an analogue electric signal $A_{out}$ corresponding to the coordinate. In order to find what coordinate data is indicated by the analogue electric signal $A_{out}$, the signal $A_{out}$ is applied to a processing unit 14 and finally a coordinate data output $D_{out}$ is obtained therefrom. The coordinate data output $D_{out}$ may be displayed on a display (DISP) or applied to a central processing unit (CPU) and processed therein. It should be understood that, in the present invention, only a system for obtaining the coordinate data output $D_{out}$ is mentioned and, accordingly, a system for dealing with the data output $D_{out}$, such as the above-mentioned display and the central processing unit, is not mentioned.

Figure 2:
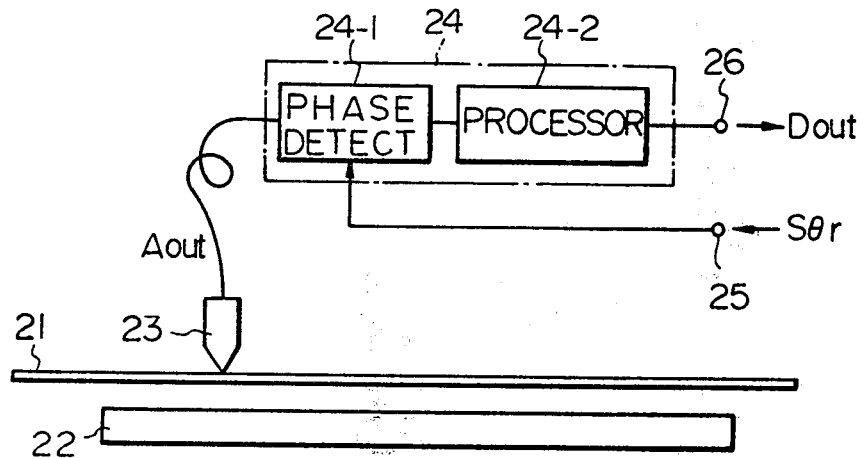
FIG. 2 illustrates the coordinate reading apparatus according to the present invention.

Now, the coordinate reading apparatus of the present invention will be explained in detail. The principle of the coordinate reading apparatus is as follows. FIG. 2 illustrates a schematic view of the coordinate reading apparatus according to the present invention. In FIG. 2, the reference numeral 21 represents a tablet (corresponding to 11 in FIG. 1), 22 represents magnetic-field generating equipment (corresponding to 12 in FIG. 1), 23 represents a position detector (corresponding to 13 in FIG. 1) and 24 represents a processing unit (corresponding to 14 in FIG. 1), wherein it should be understood that, in actual arrangement, the members 21 and 22 are formed as one body. The reference numeral 24-1 represents a phase detector and 24-2 represents a processor. The processor 24-2 stores therein, in advance, a table indicating a relationship between the coordinate x on the tablet 11 and the phase $\theta$, this is $x=f(\theta)$, and produces an x coordinate data output $D_{out}$ from an output terminal 26 via the phase detector 24-1 which detects the phase $\theta$ of the analogue electric signal $A_{out}$ supplied from the position detector 23. When the phase detector 24-1 determines the value of the phase $\theta$, it is necessary to compare the output phase $\theta$ of the signal $A_{out}$ with a reference phase $\theta_r$ and, accordingly, a signal $S\theta_r$, having a predetermined reference phase, is supplied from an input terminal 25.

Figure 3:
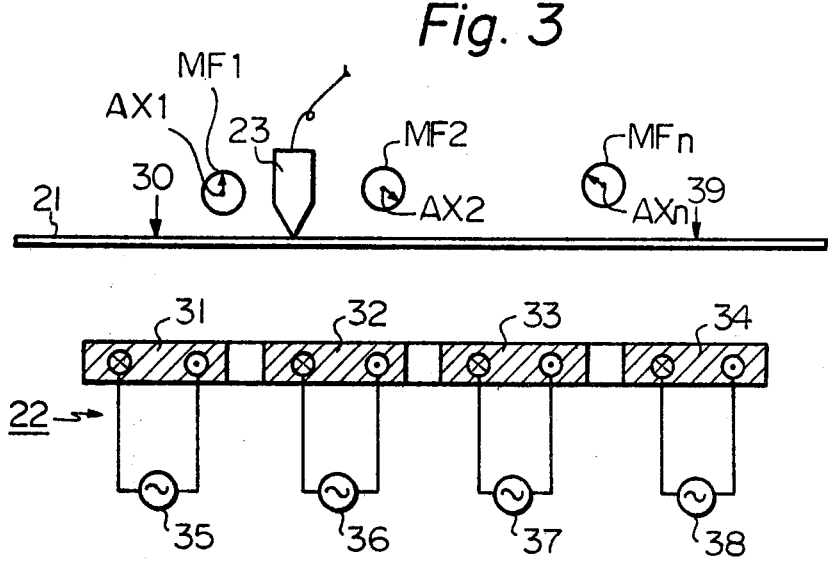
FIG. 3 illustrates an arrangement of the magnetic-field generating equipment 22 shown in FIG. 2.

The analgue electric signal $A_{out}$ from the position detector 23 is created due to a coupling between the detector 23 and the magnetic field induced by the magnetic-field generating equipment 22, where the phase $\theta$ of the signal $A_{out}$ varies in accordance with a variation of the coordinate x. In order to produce such magnetic field, the magnetic-field generating equipment can be constructed as shown in FIG. 3. FIG. 3 schematically illustrates an arrangement of the magnetic-field generating equipment 22 shown in FIG. 2. In FIG. 3, the magnetic-field generating equipment 22 is comprised of magnetic-field generating coils, for example four coils 31, 32, 33 and 34, and alternating signal sources 35, 36, 37 and 38 which apply respective alternating signals to the coils. The phases of the alternating signals are shifted with respect to each other. The magnetic fields, induced by the magnetic-field generating coils 31 through 34, cooperate with the position detector 23 above the tablet 21.

The alternating signals, produced from the above-mentioned magnetic-field generating sources 35 through 38, may be defined by, for example the following signals, respectively.

$$E_1 \sin(\omega t + 0)$$

$$E_2 \sin\left(\omega t + \frac{\pi}{3}\right)$$

$$E_3 \sin\left(\omega t + \frac{2}{3}\pi\right)$$

$$E_4 \sin(\omega t + \pi)$$

Where, $E_1$ through $E_4$ denote voltage amplitudes of the alternating signals, $\omega$ denotes an angular velocity, t denotes a time, and 0, $\pi/3$, $2/3\pi$ and $\pi$ are phases in radians. The $\pi$ is represented by $\omega = 2\pi f$ and the alternating signal sources 35 through 38 are driven synchronous with the same frequency f.

Figure 4:
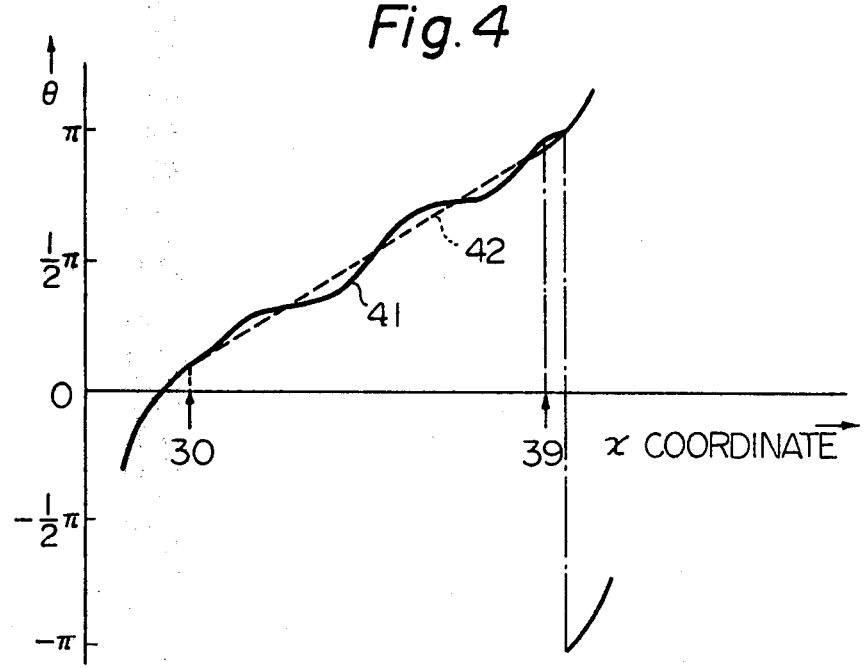
FIG. 4 is a graph illustrating the variation of the phase $\theta$ of the analogue electric signal $A_{out}$, produced from the position detector 23, with respect to the variation of the coordinate x on the tablet 21.

FIG. 4 is a graph indicating the variation of the phase $\theta$ of the analogue electric signal $A_{out}$, produced from the position detector 23, with respect to the variation of the coordinate x on the tablet 21. In the graph, a curve 41, indicated by a solid line, indicates experimental results which are obtained by using the magnetic-field generating coils 31 through 34 and the alternating signal sources 35 through 38 during a locational and continuous shift of the edge of the position detector 23 along a path between x coordinates 30 and 39 on the tablet 21. As seen from the graph, the curve 41 varies along a straight line 42, indicated by a dotted line, and thus a substantially linear relationship, between the phase $\theta$ and the x coordinate, can be realized. It should be recognized that the straight line 42, indicated by the dotted line, corresponds to the relationship, that is $x = f(\theta)$, between the coordinate x and the phase $\theta$.

As will be known from the graph, the coordinate data, between the x coordinates 30 and 39, can be obtained continuously by employing only four magnetic-field generating coils, but is not limited to four coils. The reason for this is derived from the fact that the rotating magnetic fields, each having a cylindrical shape, are continuously formed above the tablet. The cylindrical rotating magnetic fields will be explained in detail hereinafter, but in short, some of these magnetic fields may be schematically illustrated as circles MF1, MF2 ... MFn in FIG. 3. Axes AX1, AX2, ..., AXn of respective cylindrical fields extend in a direction perpendicular to the surface of the drawing. Vectors of the cylindrical fields are represented by arrows shown in respective cylindrical fields MF1, MF2, ..., MFn. These vectors rotate, for example, counterclockwise, at the angular velocity $\omega$ and thus the cylindrical fields function as the rotating magnetic fields. Further, as seen from FIG. 3, the vectors, indicated by arrows, have phase shifts relative to each other, and the amount of each relative phase shift represents the corresponding x coordinate position. The position detector 23 includes therein an iron core which is sensitive to the magnetic fields and a pick-up coil. However, such an arrangement has already been widely known. In this case, the pick-up coil induces, firstly, maximum induced voltage when the vector component is parallel with the axis of the iron core, secondly, minimum induced voltage when the vector component is perpendicular to the axis thereof and, thirdly, medium induced voltage when the vector component is directed to a direction which is inclined to the axis thereof. Consequently, the amount of the phase shift of the vector component, which is identical to the x coordinate, can be detected by supervising the variation of the level of the induced voltage.

Returning to the graph of FIG. 4, the curve 41, indicating the experimental results, shows, as a whole, good linearity. However, the curve 41 is provided with relatively small undulations thereon. Of course, such undulations cause a bad effect on the coordinate reading operation in being able to function with a high degree of accuracy. Therefore, the curve 41 must be reshaped to be a straight line.

Figure 5:
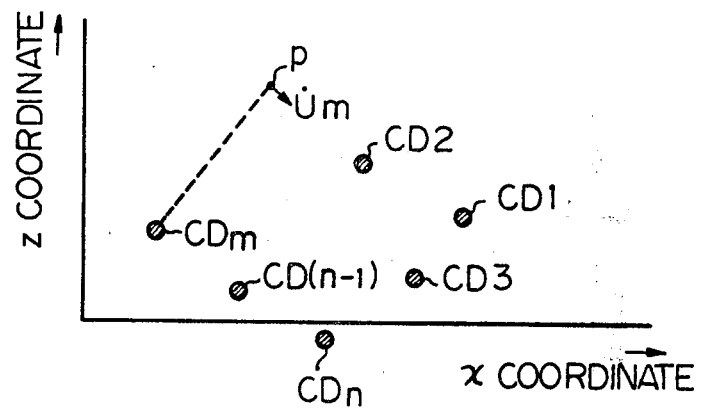
FIG. 5 illustrates an arrangement of a plurality of conductors, used for explaining the principle of the present invention.

In order to obtain such a straight line, regarding the curve 41, the inventor of the present invention has conducted the following fundamental study. First, a plurality of conductors $CD_1$, $CD_2$, $CD_3$, ..., $CD_{(n-1)}$, $CD_n$, ..., $CD_m$ are arranged in a space as shown in FIG. 5. FIG. 5 shows a general arrangement of a plurality of conductors, used for explaining the principle of the present invention. Next, certain coordinates are defined with respect to these conductors, one of the coordinates is an x coordinate and the other a z coordinate. This x coordinate is similar to the aforesaid x coordinate, but the z coordinate is a coordinate which extends from and above the surface of the tablet 21 (FIG. 2, FIG. 3). In this case, the conductors extend in a direction perpendicular to the surface of the drawing.

In these conductors $CD_1$, $CD_2$, ..., $CD_m$, currents $I_1$, $I_2$, ..., $I_m$ are supplied to flow to respective conductors. A magnetic-field vector $H_m$ which is induced by the current $I_m$ flowing through the conductor $CD_m$ is represented by the following equation (1).

$$\dot{H}_m = \frac{I_m \cdot \dot{U}_m}{2\pi \sqrt{(x_m - x_0)^2 + (z_m - z_0)^2}} \tag{1}$$

Where, $x_m$ and $z_m$ denote the position coordinates on which the conductor $CD_m$ is located, $U_m$ denotes a unit vector which extends in a direction of a tangent line from a circle, at a point p located on the circle, which circle is one of coaxial circles, having the center of $CD_m$, and passes via the point p, while $x_0$ and $z_0$ denotes the x position coordinate and z position coordinate of the point p, respectively. It should be recognized that $(x_0, z_0)$ corresponds to the coordinates on which the edge of the position detector 23 is located.

On the other hand, a magnetic field H is represented by the following equation (2), which field H is a composite magnetic field of the magnetic fields which are induced by the currents $I_1 \sim I_n$ flowing through the conductors $CD_1 \sim CD_n$, respectively.

$$\dot{H} = \sum_{m=1}^{n} \dot{H}_m \tag{2}$$

The above-recited equation (1) can be rewritten as the following equation (3), where the unit vector $U_m$ is expressed by unit vectors x and z which are defined along, respectively, the x coordinate and the z coordinate.

$$\dot{H}_m = \frac{I_m\{\dot{x}_m(z_m - z_0) - \dot{z}(x_m - x_0)\}}{2\pi\{(X_m - x_0)^2 + (z_m - z_0)^2\}} \tag{3}$$

Further, the composite magnetic field $\dot{H}$, at an arbitrary point p, can be represented by the following equation (4), by using the above-recited equation (2).

$$\dot{H} = \dot{x} \sum_{m=1}^{n} \frac{I_m(z_m - z_0)}{2\pi\{(x_m - x_0)^2 + (z_m - z_0)^2\}} - \tag{4}$$

-continued

Where, $K_x$, $K_z$, $\theta_x$ and $\theta_z$ are, respectively, expressed by the following expressions.

$$K_x = \sqrt{\left[\sum_{m=1}^{n} \frac{A_m \cos\phi_m (z_m - z_0)}{(x_m - x_0)^2 + (z_m - z_0)^2}\right]^2 + \left[\sum_{m=1}^{n} \frac{A_m \sin\phi_m (z_m - z_0)}{(x_m - x_0)^2 + (z_m - z_0)^2}\right]^2}$$

$$K_z = \sqrt{\left[\sum_{m=1}^{n} \frac{A_m \cos\phi_m (x_m - x_0)}{(x_m - x_0)^2 + (z_m - z_0)^2}\right]^2 + \left[\sum_{m=1}^{n} \frac{A_m \sin\phi_m (x_m - x_0)}{(x_m - x_0)^2 + (z_m - z_0)^2}\right]^2}$$

$$\theta_x = \arctan \left[\frac{\sum_{m=1}^{n} \frac{A_m \sin\phi_m (z_m - z_0)}{(x_m - x_0)^2 + (z_m - z_0)^2}}{\sum_{m=1}^{n} \frac{A_m \cos\phi_m (z_m - z_0)}{(x_m - x_2)^2 + (z_m - z_0)^2}}\right] + \frac{\pi}{2} \frac{A}{|A|} - \frac{\pi}{2}$$

$$\theta_z = \arctan \left[\frac{\sum_{m=1}^{n} \frac{A_m \sin\phi_m (x_m - x_0)}{(x_m - x_0)^2 + (z_m - z_0)^2}}{\sum_{m=1}^{n} \frac{A_m \cos\phi_m (x_m - x_0)}{(x_m - x_0)^2 + (z_m - z_0)^2}}\right] + \frac{A}{2|A|} - \frac{\pi}{2}$$

$$\dot{z} \sum_{m=1}^{n} \frac{I_m (x_m - x_0)}{2\pi\{(x_m - x_0)^2 + (z_m - z_0)^2\}}$$

The equation (4) can further be rewritten as the following equation (5) by introducing the current $I_m$ into the equation (4), where the current $I_m$ is expressed by the expression, that is $$I_m = A_m \sin(\omega t + \phi_m)$$
$$= A_m \sin\omega t \cos\phi_m + A_m \cos\omega t \sin\phi_m \text{ (where, } \phi_m \text{ denotes a phase).}$$

$$\dot{H} = \dot{x} \left[\sin\omega t \cdot \sum_{m=1}^{n} \frac{A_m \cos\phi_m (z_m - z_0)}{2\pi\{(x_m - x_0)^2 + (z_m - z_0)^2\}} + \cos\omega t \cdot \sum_{m=1}^{n} \frac{A_m \sin\phi_m (z_m - z_0)}{2\pi\{(x_m - x_n)^2 + (z_m - z_0)^2\}}\right] - \dot{z} \left[\sin\omega t \cdot \sum_{m=1}^{n} \frac{A_m \cos\phi_m (x_m - x_0)}{2\pi\{(x_m - x_0)^2 + (z_m - z_0)^2\}} + \cos\omega t \cdot \sum_{m=1}^{n} \frac{A_m \sin\phi_m (x_m - x_0)}{2\pi\{(x_m - x_0)^2 + (z_m - z_0)^2\}}\right] \quad (5)$$

Further, the equation (5) can be rewritten as the following equation (6) by taking into consideration that, generally, the relationship $$A\sin X + B\cos X = \sqrt{A^2 + B^2} \cdot \sin(X + Y)$$

$$\left(\text{where } Y = \arctan(B/A) - \frac{\pi}{2} + \frac{\pi}{2} \cdot \frac{A}{|A|}\right) \text{ exists.}$$

$$\dot{H} = \dot{x} \frac{K_x}{2\pi} \sin(\omega t + \theta_x) - \dot{z} \cdot \frac{K_z}{2\pi} \sin(\omega t + \theta_z) \quad (6)$$

Thus, the magnetic-field vector H, at an arbitrary point on the x-z coordinates, can be expressed by the above-recited equation (6). However, it may be very difficult to imagine immediately, from the equation (6), how the magnetic field is actually formed above the tablet.

Figure 6:
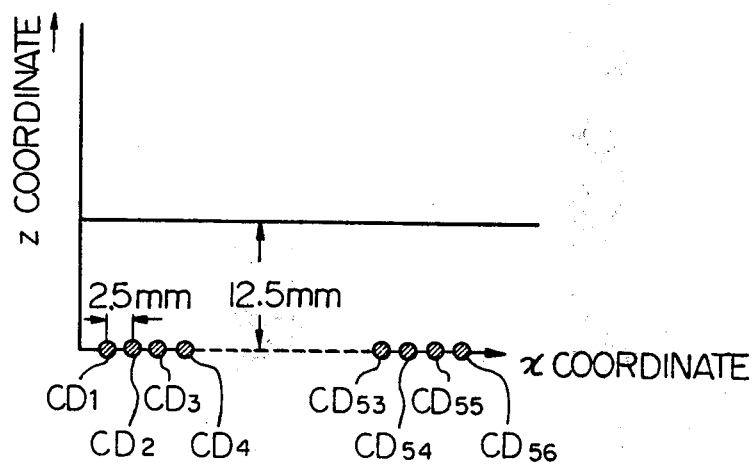
FIG. 6 illustrates an arrangement of a plurality of conductors, used for explaining the principle of the present invention.

In order to imagine the actual form of the magnetic field, some experimentation has been conducted. First, fifty-six conductors $CD_1$, $CD_2$, ..., $CD_{56}$ are arranged in a single file along the x coordinate as shown in FIG. 6. FIG. 6 shows actual arrangement of a plurality of conductors, used for explaining the principle of the present invention. In the above-mentioned experiment, the distance between the x coordinate and the single file of the conductors, is selected to be 12.5 mm and the distance between each two adjacent conductors, is selected to be 2.5 mm. Next, the currents $I_1$, $I_2$, ..., $I_{56}$, which will be able to reform the curve 41, including the aforesaid undulations, in to a straight line, are investigated with the aid of a computer, based on the above-recited equation (6). As a result of this investigation, the following table has been obtained, which table indicates an amplitude of each of the currents $I_1 \sim I_{56}$, flowing respectively through the conductors $CD_1 \sim CD_{56}$, (corresponding to $A_m$ appearing in some of the above-recited equations) and also a phase of each of these currents $I_1 \sim I_{56}$ (corresponding to $\phi_m$ appearing in some of the above-recited equations).

TABLE

| CD | $A_m$ | $\phi_m$ |
|---|---|---|
| $CD_1$, $CD_2$, $CD_3$, $CD_4$ | 1 | 0° |
| $CD_6$, $CD_8$, $CD_{10}$, $CD_{12}$ | −1 | 0° |
| $CD_5$, $CD_7$, $CD_9$, $CD_{11}$ | 1 | 30° |
| $CD_{14}$, $CD_{16}$, $CD_{18}$, $CD_{20}$ | −1 | 30° |
| $CD_{13}$, $CD_{15}$, $CD_{17}$, $CD_{19}$ | 1 | 60° |
| $CD_{22}$, $CD_{24}$, $CD_{26}$, $CD_{28}$ | −1 | 60° |
| $CD_{21}$, $CD_{23}$, $CD_{25}$, $CD_{27}$ | 1 | 90° |
| $CD_{30}$, $CD_{32}$, $CD_{34}$, $CD_{36}$ | −1 | 90° |
| $CD_{29}$, $CD_{31}$, $CD_{33}$, $CD_{35}$ | 1 | 120° |
| $CD_{38}$, $CD_{40}$, $CD_{42}$, $CD_{44}$ | −1 | 120° |
| $CD_{37}$, $CD_{39}$, $CD_{41}$, $CD_{43}$ | 1 | 150° |
| $CD_{46}$, $CD_{48}$, $CD_{50}$, $CD_{52}$ | −1 | 150° |
| $CD_{45}$, $CD_{47}$, $CD_{49}$, $CD_{51}$ | 1 | 180° |

TABLE-continued

| CD | $A_m$ | $\phi_m$ |
|---|---|---|
| $CD_{53}, CD_{54}, CD_{55}, CD_{56}$ | $-1$ | $180°$ |

Figure 7A:
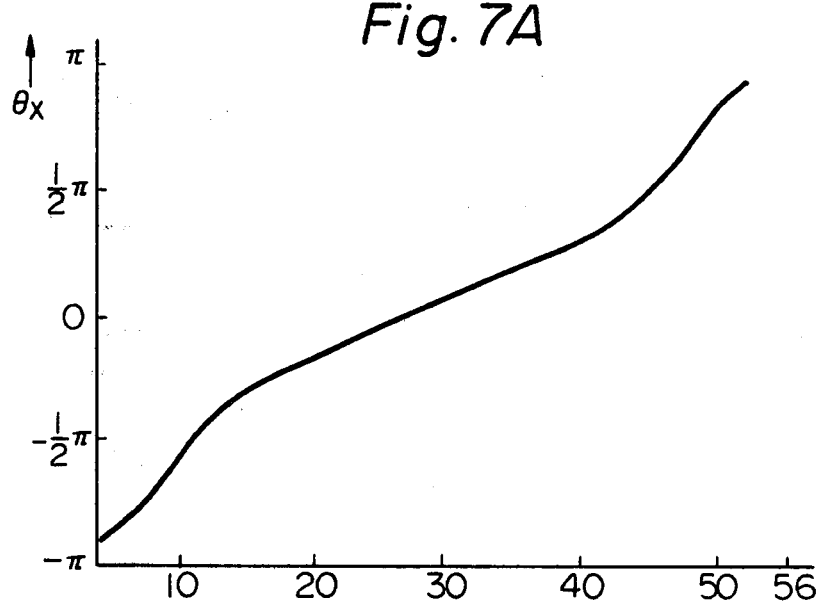
FIG. 7A is a graph illustrating the result of the arithmetic operation for obtaining a relationship between the x coordinate and the phase $\theta_x$ of the magnetic-field vector existing above the x coordinate under an arrangement of FIG. 6.
Figure 7B:
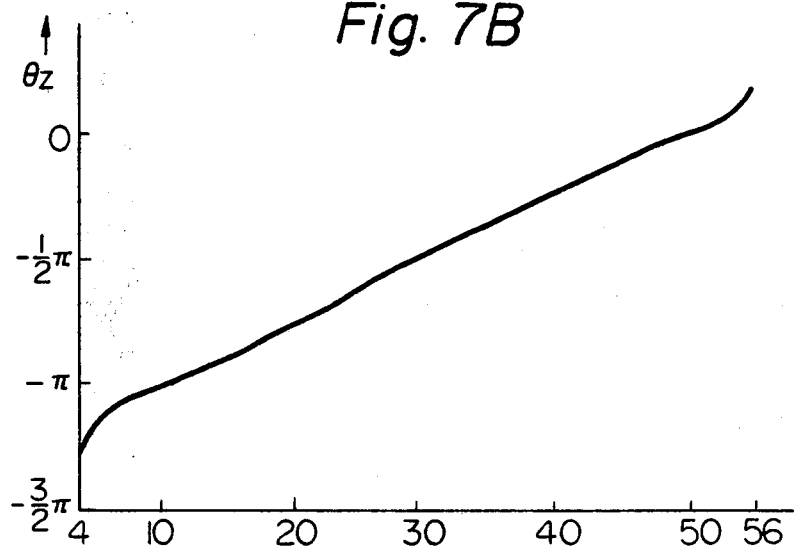
FIG. 7B is a graph illustrating the result of the arithmetic operation for obtaining a relationship between the x coordinate and the phase $\theta_z$ of the magnetic-field vector existing above the x coordinate.

The phase $\theta_x$ (corresponding to the angle of the magnetic-field vector regarding the component parallel to the x coordinate axis) and the phase $\theta_z$ (corresponding to the angle of the magnetic-field vector regarding the component parallel to the z coordinate axis), both included in the analogue electric signal from the position detector 23, can be derived from an arithmetic operation, wherein, firstly, fifty-six conductors $CD_1 \sim CD_{56}$ are arranged in a layout as shown in FIG. 6, secondly currents, which satisfy the conditions $(A_m, \phi_m)$ indicated in the above-recited Table, are supplied to respective conductors, thirdly, the position detector 23 is located on the x coordinate (corresponding to the surface of the table) and fourthly the position detector 23 is continuously moved leftward and rightward on the x coordinate. The results of the above-mentioned arithmetic operation are shown in graphs of FIGS. 7A and 7B. FIG. 7A is a graph indicating the result of the arithmetic operation for obtaining a relationship between the x coordinate and the phase $\theta_x$ of the magnetic-field vector existing above the x coordinate under an arrangement of FIG. 6. FIG. 7B is a graph indicating the result of the arithmetic operation for obtaining a relationship between the x coordinate and the phase $\theta_z$ of the magnetic-field vector existing above the x coordinate. According to the graphs of FIGS. 7A and 7B, it can be expected that the phase of the analogue electric signal varies, with good linearity, with respect to a variation of the x coordinate. Further it can be recognized that the phase $\theta_x$ of FIG. 7A is shifted by $\pi/2$ compared to the phase $\theta_z$ of FIG. 7B, which fact teaches that the magnetic-field vectors are rotating and, accordingly, it is proved that the above-mentioned rotating magnetic fields are actually formed above the tablet. It should be recognized that the numbers, indicated along the abscissas of the graphs, correspond to the positions (1, 2, ..., 56) of the conductors ($CD_1$, $CD_2$ ... $CD_{56}$) shown in FIG. 6.

Next, how the relationships and conditions, indicated in the above-recited Table, can actually be satisfied, will be explained in detail. For the purpose of simplifying the explanations, the following descriptions will be made by taking as an example a case where only three sets exist, each of which sets is comprised of both the magnetic-field generating coil and corresponding alternating signal source. In short, the coil-source sets (31, 35), (32, 36) and (33, 37) exist. Although the rotating magnetic fields of the present invention can be formed merely by three such sets, at a minimum, seven sets are employed in a preferred embodiment according to the present invention.

The alternating signal sources 35, 36 and 37 produce the following three outputs, respectively.

$$A_1\sin(\omega t + 0)$$

$$A_2\sin\left(\omega t + \frac{\pi}{2}\right)$$

$$A_3\sin(\omega t + \pi)$$

Figure 8:
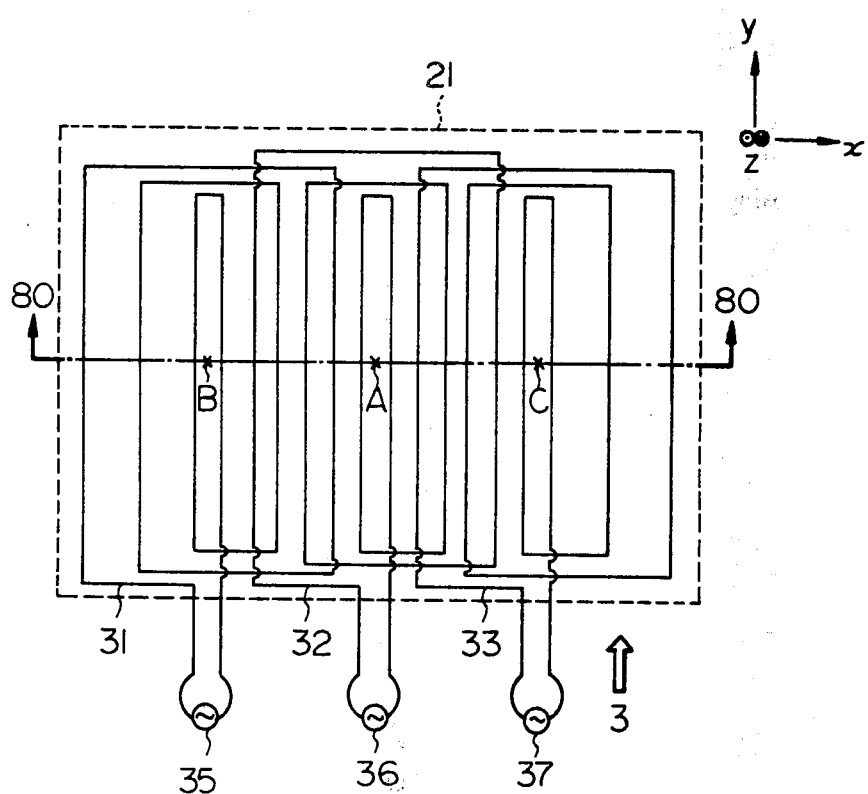
FIG. 8 is a plan view illustrating an arrangement, according to the present invention, of the magnetic-field generating coils (31, 32, 33)

In this case, a reference phase is defined by the phase of the output analogue electric signal from the position detector 23 (FIG. 3) when the detector 23 is located on the tablet 21 (FIG. 3) at the position facing toward the magnetic-field generating coil 31. Then the phase of the output analogue electric signal is shifted by $+\frac{1}{2}\pi$ with respect to the reference phase when the position decoder 23 is located at the position facing toward the magnetic-field generating coil 32. Similarly, the phase is shifted by $+\pi$ when located at the position facing toward the magnetic-field generating coil 33. Accordingly, the phase is shifted by $+\frac{1}{4}\pi$ when located at a middle position, on the tablet, between the magnetic-field generating coils 31 and 32, similarly, the phase is shifted by $+\frac{3}{4}\pi$ when located, on the tablet, at a middle position between the magnetic-field generating coils 32 and 33. Thus, the phase of the analogue electric signal from the position detector 23 varies such as 0, $\frac{1}{4}\pi$, $2/4\pi$, $\frac{3}{4}\pi$, $\pi$ ..., with respect to the reference phase, in accordance with the variation of the x coordinate on which the detector 23 is located. In this case, the magnetic-field generating coils 31, 32 and 33 are arranged with a particular pattern. FIG. 8 is a plan view illustrating particular arrangement, according to the present invention, of the magnetic-field generating coils (31, 32, 33). It should be understood that FIG. 8 is a plan view seen from a position located right above the tablet 21 of FIG. 3. This arrangement will further be clarified with reference to the coordinate axises of x, y and z indicated at the right top of FIG. 8. In short, the view seen from an arrow 3 of FIG. 8 corresponds to the view of FIG. 3, but the coil 34 of FIG. 3 is not illustrated in FIG. 8. A cross-sectional view, taken along a line 80—80 shown in FIG. 8, corresponds to the view of FIG. 6. The particular pattern of the coils shown in FIG. 8 has the following features. Firstly, each of the magnetic-field coils has a plurality of turns and these turns are wound in a spiral-like shape. Secondly, each of the magnetic-field coils is distributed on the same flat plane. Thirdly, a part of turns of one magnetic-fiel generating coil are introduced between a part of turns of another adjacent magnetic-field generating coil. In other words, the magnetic-field generating coils are arranged along the x coordinate axis and partially overlapped by the adjacent magnetic-field generating coil. In this case, each of the turns is preferably formed in a rectangular spiral shape. It should be noted that the magnetic-field generating coils are electrically insulated from each other. Therefore, each of crossover points between the turns must be prevented from being electrically shorted, by fabricating, for example a through hole so as to bypass the crossover point. Alternately, a thin insulation layer can be inserted between each two adjacent magnetic-field generating coils so as to prevent an occurrence of such an electric short.

Figure 9A:
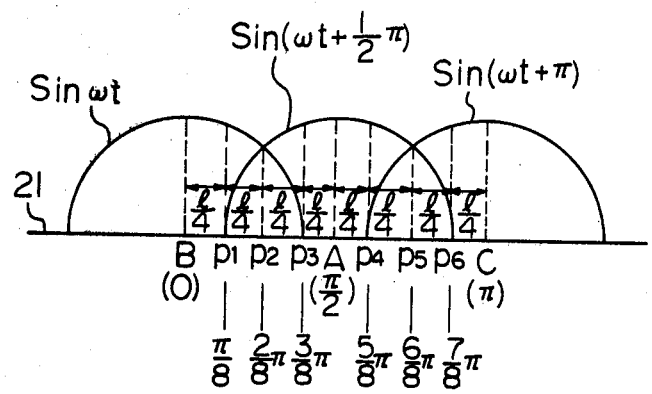
FIG. 9A depicts a distribution of the magnetic fields seen from points A, B and C shown in FIG. 8.
Figure 9B:
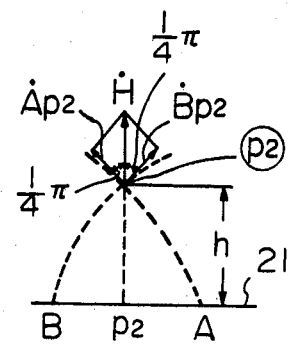
FIG. 9B is a graph used for explaining how the magnetic-field, above point p2 of FIG. 9A, is created.

The magnetic fields, created on and above the tablet 21 of FIG. 8, will be explained with reference to FIG. 9A and 9B. FIG. 9A schematically depicts a distribution of the magnetic fields seen from points A, B and C shown in FIG. 8. FIG. 9B is a view used for explaining how the magnetic-field, above a point p2 of FIG. 9A, is created. It should be understood that the points A, B and C represent center positions of the magnetic-field generating coils 31, 32 and 33, respectively. Regarding the alternating currents $A_1 \sin(\omega t+0)$, $A_2 \sin(\omega t+\frac{1}{2}\pi)$ and $A_3 \sin(\omega t+\pi)$, produced respectively from the alternating signal sources 35, 36 and 37 to be applied, respectively, to the magnetic-field generating coils 31, 32 and 33, the amplitudes of these currents are preferably the same value, that is $A_1 = A_2 = A_3$.

In FIG. 9A, the distance between the points A and B is selected to be 1, and the distance is divided evenly into four parts (1/4) at points p1, p2 and p3. The distance between the points A and C is also evenly divided into four parts (1/4) at points p4, p5 and p6. Under such setting of the table, the phases of the magnetic-field vectors, with respect to the reference phase, at respective points, above the tablet 21 with a height of h and corresponding to these points (B, p1~p3, A, p4~p6, C), can be expressed as follows.

$$B: 0$$
$$p1: \frac{1}{8}\pi$$
$$p2: \frac{2}{8}\pi$$
$$p3: \frac{3}{8}\pi$$
$$A: \frac{4}{8}\pi$$
$$p4: \frac{5}{8}\pi$$
$$p5: \frac{6}{8}\pi$$
$$p6: \frac{7}{8}\pi$$
$$C: \pi$$

With reference to FIG. 9B, the magnetic-field vector H, created at an arbitrary point on the setting of FIG. 9A, can be determined by the following procedure, in which the arbitrary point is, for example a point (p2) located above the point p2 with the height of h. The magnetic-field vector $\dot{B}_{p2}$ at the point (p2), induced by the magnetic-field generating coil 31 (having the center B), is advanced in phase by $\frac{1}{4}\pi$ with respect to the phase of the magnetic-field vector $\dot{B}$ induced at the center B. The magnetic-field vector, induced by the magnetic-field generating coil, rotates clockwise viewed from the arrow 3 in FIG. 8. Thus, the phase advances in a clockwise direction. In this case, since the magnetic-field vector B has a component of $A_0 \sin(\omega t + 0)$, the magnetic-field vector $B_{p2}$ has a component of $A_0 \sin(\omega t + \frac{1}{4}\pi)$. Similarly, the magnetic-field vector $\dot{A}_{p2}$ at the point (p2), induced by the magnetic-field generating coil 32 (having the center A), is advanced in phase by $\frac{1}{4}\pi$ with respect to the phase of the magnetic-field vector $\dot{A}$ induced at the center C. In this case, since the magnetic-field vector $\dot{A}$ has a component of $A_0 \sin(\omega t + \frac{1}{2}\pi)$, the magnetic-field vector $\dot{A}_{p2}$ has a component of $A_0 \sin(\omega t + \frac{1}{2}\pi - \frac{1}{4}\pi)$. Thus, the magnetic-field vector H, at the point (p2), is expressed by an addition of these vectors $\dot{A}_{p2}$ and $\dot{B}_{p2}$ and has a component shown in the following equation (7).

$$A_0 \sin\left(\omega t + \frac{1}{4}\pi\right) + A_0 \sin\left(\omega t + \frac{1}{2}\pi - \frac{1}{4}\pi\right) = \quad (7)$$

-continued $$K_0 \sin\left(\omega t + \frac{\pi}{4}\right)$$

As understood from the equation (7), the phase of the analogue electric signal, produced from the position detector located at the point p2, is shifted by $\frac{1}{4}\pi$ with respect to the reference phase. Therefore, if the phase shift of $\frac{1}{4}\pi$ is detected, it is determined that the position detector is now located at the point p2.

Figure 10:
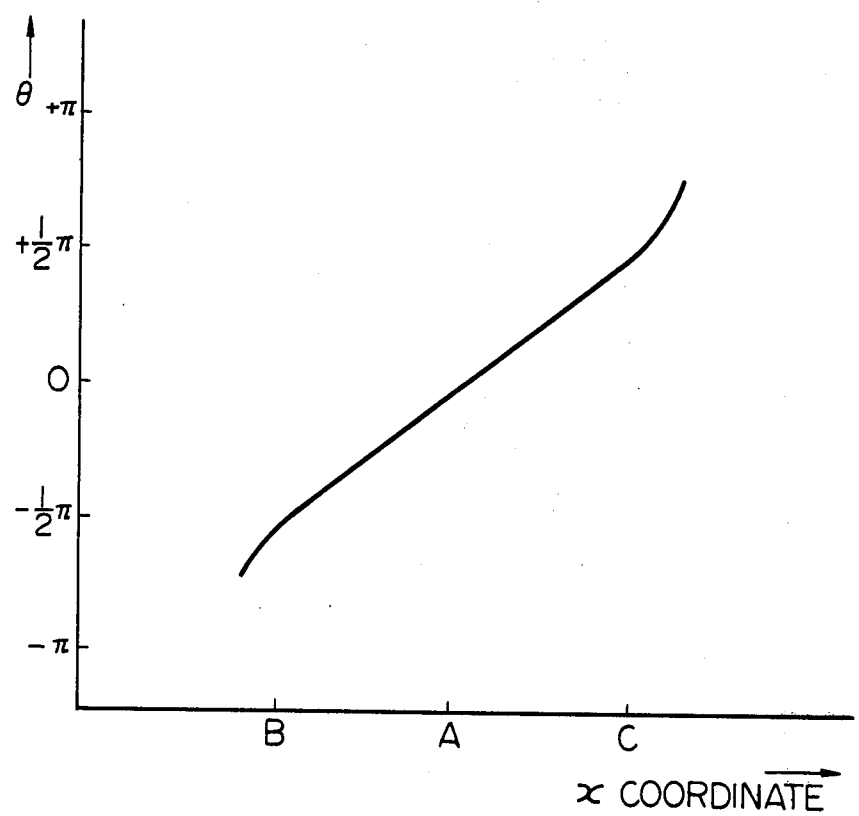
FIG. 10 is a graph illustrating a variation of the phase $\theta$ of the analogue electric signal in accordance with a variation of the x coordinate.

FIG. 10 is a graph indicating a variation of the phase $\theta$ of the analogue electric signal in accordance with a variation of the x coordinate. In the graph, the x coordinates A, B and C are identical to those shown in FIGS. 8 and 9A. As apparent from the graph of FIG. 10, the magnetic-field generating coils, arranged with the particular pattern of the present invention as shown in FIG. 8, can provide a very good linearity. If the linearity is not so good, it may easily be improved by slightly adjusting the arrangement of the magnetic-field generating coils.

It should be noted that since the coordinate reading apparatus of the present invention reads the variation of the x coordinate by using the variation of the phase which is detected by the vector component of the rotating magnetic field, in coordinate reading apparatus does not produce a defect similar to the aforesaid first defect, as does the prior art coordinate reading apparatus, based on the electrostatic coupling method. That is, the coordinate reading apparatus can maintain a high reading accuracy, even though an external dielectric object exists near the tablet.

Figure 11:
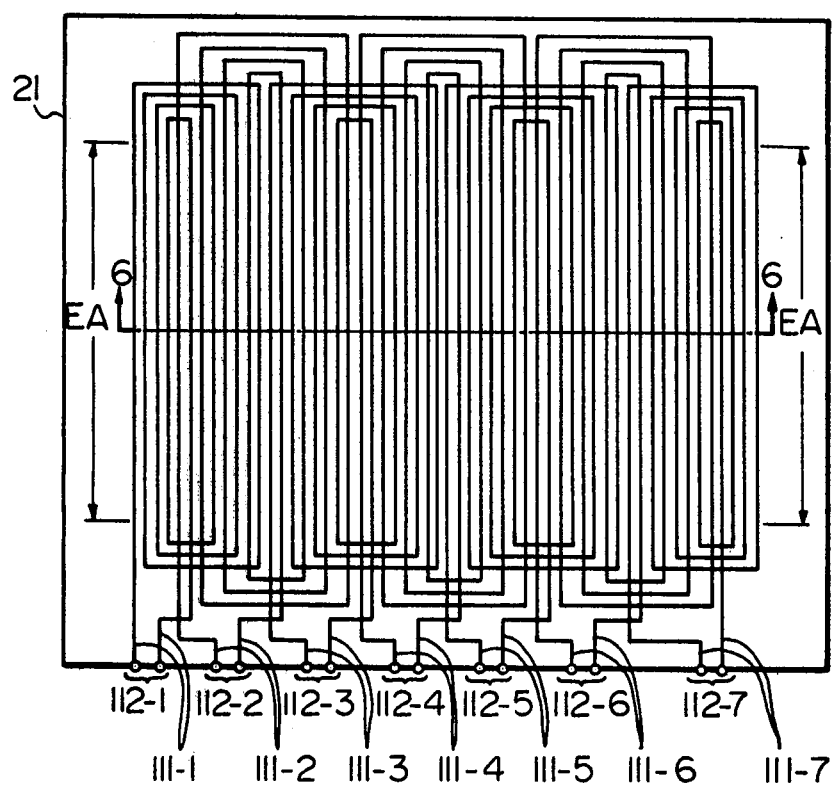
FIG. 11 illustrates an arrangement of seven-phase magnetic-field generating coils according to the embodiment of the present invention.

As previously mentioned, in FIG. 8, three alternating signal sources 35, 36 and 37 having three different phases from each other, and also three magnetic-field generating coils 31, 32 and 33 cooperating with the respective alternating signal sources, are taken as an example, in order to simply the explanations of the present invention. However, according to the embodiment of the present invention, seven alternating signal sources having different signal phases with respect to each other and also seven magnetic-field generating coils, cooperating with the respective alternating signal sources, are employed so as to increase the accuracy for reading the coordinate. FIG. 11 is a plan view illustrating an arrangement of seven-phase magnetic-field generating coils according to the embodiment of the present invention. As seen from FIG. 11, seven magnetic-field generating coils 111-1, 111-2, . . . , 111-7 are arranged with a pattern similar to the above-mentioned particular pattern. These magnetic-field generating coils are connected to corresponding alternating signal sources (not shown) 112-1, 112-2, . . . , 112-7. The relative phases ($\phi_m$) of the alternating signals, produced from the alternating signal sources 112-1~112-7 are predetermined as follows.

$$112\text{-}1: 0$$
$$112\text{-}2: \frac{1}{6}\pi$$
$$112\text{-}3: \frac{2}{6}\pi$$
$$112\text{-}4: \frac{3}{6}\pi$$

-continued 112-5: $\frac{4}{6}\pi$ 112-6: $\frac{5}{6}\pi$ 112-7: $\pi$

Further, in FIG. 11, the reference symbol EA denotes an effective area. The accuracy for reading can be guaranteed in so far as the position detector is located within the area EA. It should be understood that the arrangement of the conductors, shown by a cross-sectional view taken along a line 6—6 of FIG. 11, is identical to the arrangement of the conductors shown in FIG. 6 and there are fifty six conductors which are cut by said line 6—6, that is the fifty six conductors $CD_1 \sim CD_{56}$.

Generally, in the coordinate reading apparatus, based on the electromagnetic induction method or the electrostatic coupling method, correct reading of the coordinate can be achieved only when the position detector is handled in such a manner that the detector stands at right angles with respect to the surface of the tablet. However, it is very inconvenient for an operator to always handle the position detector without inclining it with respect to the vertical axis of the tablet. In order to avoid such inconvenience, in the prior art, particular means for detecting the tilt angle of the detector, had to be employed, which is the aforementioned second defect. FIGS. 12A and 12B are front views of the prior art particular means for detecting the tilt angle of the position detector. In these figures, the above-mentioned particular means is illustrated by a pair of differential coils 121 and 122, included in a part of the position detector 23. When the position detector 23 stands at right angles on the tablet 21 as shown in FIG. 12A, the outputs from the coils 121 and 122 are the same level and, accordingly no differential output voltage is generated. In this case, it is not necessary to compensate the read coordinate data. Contrary to this, when the position detector 23 is inclined, at an angle, with respect to the tablet 21, the outputs from the coils 121 and 122 are different from each other and, accordingly, the differential output voltage is generated from the particular means. The level of the differential output voltage is usually proportional to the amount of the tilt angle and, accordingly correct coordinate data can be obtained by compensating the read coordinate data according to the level of the differential output voltage. However, it is not preferable to employ such a particular means from an economical view point, and besides it is almost impossible to guarantee highly accurate reading of the coordinate data.

The coordinate reading apparatus of the present invention can further produce another feature in that highly accurate reading is always expected regardless of the tilt angle of the position detector, without employing such particular means. This feature is produced due to the presence of the above-mentioned rotating magnetic fields, which will be clarified with reference to FIG. 13. FIG. 13 is a view, used for explaining the fact that the prior art particular means is not necessary in the coordinate reading apparatus according to the present invention. In FIG. 13, the rotating magnetic field MF exists above the tablet 21. It should be understood that, in this figure, although a great number of rotating magnetic fields exist along the x coordinate axis with variations of the phases of the vector components, only one rotating magnetic field MF is illustrated as an example.

The magnetic-field vector is represented by the symbol $\vec{H}$ having a magnitude of $H_0$. The vector $\vec{H}$ can be decomposed into two orthogonal components $H_x$ and $H_z$ which are expressed by the following equations (8) and (9).

$$H_x = H_0\cos(\omega t + ax) \qquad (8)$$

$$H_z = H_0\sin(\omega t + ax) \qquad (9)$$

In this FIG. 13, the center of the magnetic-field vector $\vec{H}$ is located above the tablet 21 at the height of h which represents a distance between the edge of the position detector 23 and a pick-up coil 131 (an iron core which is part of the coil 131 is not illustrated) included in the position detector.

In the above recited equations (8) and (9), the phase component ax is equivalent to the above mentioned phase $\theta$ and, accordingly ax will continuously vary, such as $0, \pi/4, \pi/2 \text{---}$.

The location of the above-mentioned pick-up coil 131, that is the height h, is expressed, in general, as a variable z along the z coordinate axis. Thus, the magnetic-field vector H, at the location of the pick-up coil, should be modified by using the variable z. In this case, the variation of the variable z corresponds to the variation of the vector component in the phase of the magnetic-field vector. That is, the variation of the variable z is developed as a phase variation factor f(z) being proportional to the value of the variable z regarding the height h. As a result, the above recited equations (8) and (9) can be rewritten, in general, as the following equations (10) and (11).

$$H_x = H_0\cos(\omega t + ax + f(z)) \qquad (10)$$

$$H_z = H_0\sin(\omega t + ax + f(z)) \qquad (11)$$

Therefore, the pick-up coil 131 produces the analogue electric signal, having a voltage amplitude $V_p$ which is proportional to the value $H_z$ of the equation (11). This is because, the pick-up coil 131 is positioned so as to be sensible only to the magnetic-field component along the z coordinate axis. Thus, the analogue electric signal is produced, which has the voltage amplitude $V_p$. The amplitude $V_p$ is expressed by the following equation (12).

$$V_p = \beta H_0\sin(\omega t + ax_1 + f(h)) \qquad (12)$$

Where, the symbol $\beta$ denotes a magnetic field-voltage transducing coefficient of the pick-up coil 131. The symbols $(x_1, h)$ denote the x-z coordinates indicating the location of the pick-up coil 131.

The above recited equation (12) is satisfied in a case where the position detector 23 stands at right angles on the tablet 21 and, accordingly the equation (12) is not satisfied in a case where the position detector 23 stands on the table 21 at a tilt angle $\alpha$ (radian). The latter case will be considered as follows, wherein the voltage amplitude of the analogue electric signal from the pick-up coil 131 is represented by a symbol $V_p'$. To be more specific, it is important to know how the voltage amplitude of the signal changes from $V_p$ to $V_p'$ when the pick-up coil 131 moves from a position p131 to a position p'131. The following equation (13) expresses the value of the voltage amplitude $V_p'$ at the latter position p′131.

$$V'_p = \beta H_0\{\sin(\omega t + ax_1 - ah\sin\alpha + f(h\cos\alpha))\cos\alpha + \quad (13)$$
$$\cos(\omega t + ax_1 - ah\sin\alpha + f(h\cos\alpha))\sin\alpha\}$$
$$= \beta H_0 \sin(\omega t + ax_1 - ah\sin\alpha + f(h\cos\alpha) + \alpha)$$

Next, the difference between the amplitude $V_p$ of the equation (12) and the amplitude $V_p'$ of the equation (13), that is $(V_p - V_p')$, will be expressed by the following equation (14).

$$V_p - V'_p = f(h) + ah\sin\alpha - f(h\cos\alpha) - \alpha \quad (14)$$

Confirming again that, in the coordinate reading apparatus of the present invention, the voltage amplitudes $V_p$ and $V_p'$ should be the same level, even though the pick-up coil 131 moves from the position p131 to the position p′131 and vice versa. In other words, the level of the analogue electric signal must always be constant at any tilt angle of the position detector 23 so as to overcome the aforesaid second defect. In short, regarding the above recited equation (14), $V_p = V_p'$ must be satisfied. As a result, the following equation (15) is obtained.

$$f(h) + ah\sin\alpha - f(h\cos\alpha) - \alpha = 0 \quad (15)$$

If the pick-up coil 131 is located, in the position detector, very close to the tablet 21, the level of the analogue electric signal from the coil 131 is determined only by each conductor which is located very close to the edge of the position detector and, accordingly, the above mentioned level varies, alternately and very furiously, high and low during a continuous movement of the position detector along the x coordinate axis. This means that normal reading of the coordinate data cannot be expected.

Contrary to the above, if the pick-up coil 131 is located, in the position detector, far from the tablet 21, for example several centimeters over therefrom, the above mentioned level varies, not alternately and not furiously, high and low. At the same time, the coil 131 can engage with normal rotating magnetic fields. Under such normal condition, the following equation (16) is satisfied.

$$f(h) \approx f(h\cos\alpha) \quad (16)$$

Further, the following equation (17) is obtained, by taking the above recited equations (15) and (16) into account.

$$ah\sin\alpha - \alpha = 0 \quad (17)$$

Accordingly, the following equation (18) is obtained from the equation (17)

$$ah\sin\alpha = \alpha \quad (18)$$

When the tilt angle $\alpha$ vaires within a range between 0 (radians) and $\frac{1}{4}\pi$ (radians), the following approximate equation (19) applies.

$$\sin\alpha \approx \alpha \quad (19)$$

Therefore, the following equation will result from (19), by taking the equation (18) into account.

$$ah \approx 1 \quad (20)$$

In other words, if the values a and h are selected so as to satisfy the approximate relationship $ah \approx 1$, the level of the analogue electric signal can always be maintained constant, even if the tilt angle of the position detector varies within a wide range between 0 (radians) and $\frac{1}{4}\pi$ (radians).

From another view point, with reference to FIG. 13, when the pick-up coil 131 is located at the position p131, the corresponding magnetic-field vector, at the position p131, is generated in a direction along the arrow H131 (at this time, the coil 131 produces the signal having maximum voltage amplitude $V_p$), while, when the coil 131 is located at the position p′131, the corresponding magnetic-field vector, at the position p′131, is generated in a direction along the arrow H′131 due to the rotation of vector (refer to arrows in MF1, MF2 ... MFn shown in FIG. 3) and, accordingly, the coil 131 can still produce, at the position p′131, a signal having the same maximum voltage amplitude $V_p$, which $V_p$ indicates that the edge of the position detector is located at the x coordinate x1.

The above-mentioned symbol a denotes a factor which is called hereinafter as a phase-deviation ratio, which phase-deviation ratio a is equivalent, in FIG. 10, to a gradient of the straight line (between the x coordinates B and C), that is $d\theta/dx$. To be more specific, the value of the ratio a is proportional to the pitch with which each two adjacent conductors ($CD_1$, $CD_2$ ... $CD_{56}$) are arranged (see FIG. 6).

It should be recognized that, generally the operator handles, most of the time, the position detector 23 with some tilt angle, as he does in gripping the usual pencil, and therefore the z coordinate axis can be defined by taking said tilt angle ($\alpha'$), in advance, into account, so that the equation (18) may be rewritten to read as the following equation (21).

$$ah\sin(\alpha - \alpha') = \alpha - \alpha' \quad (21)$$

Thus, according to the present invention, correct coordinate data reading can always be realized, even if the position detector 23 inclines at any tilt angle, between about 0 (radian) and $\frac{1}{4}\pi$ (radian), without employing any particular means, as mentioned previously, into the reading apparatus.

Figure 14:
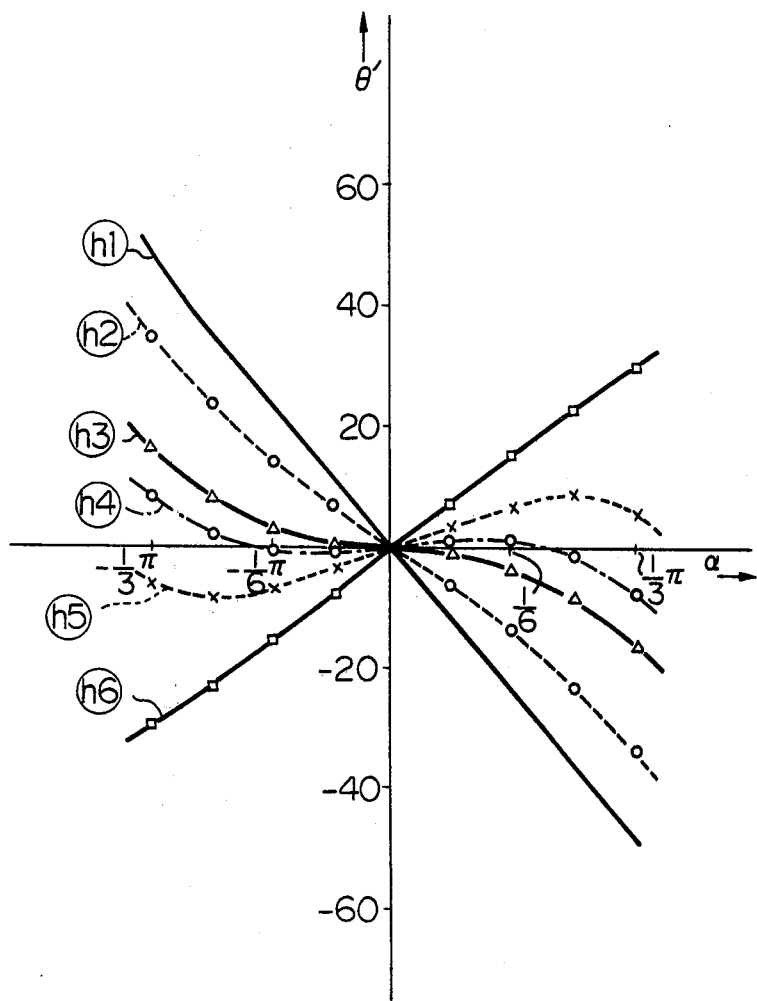
FIG. 14 is a graph illustrating a relationship between the tilt angle $\alpha$ of the position detector 23 and a variation in phase $\theta'$.

FIG. 14 is a graph indicating a relationship between the tilt angle $\alpha$ of the position detector 23 and a variation in phase $\theta'$. In the graph 14, the abscissa indicates the tilt angle $\alpha$ and the ordinate indicates the variation in phase $\theta'$. The phase $\theta'$ corresponds to the term $(ax_1 + f(h))$, expressed in the above recited equation (12), or the term $(ax_1 - ah\sin\alpha + f(h\cos\alpha) + \alpha)$, expressed in the above recited equation (13). In the experiment for obtaining the graph of FIG. 14, the edge of the position detector 23 is fixedly located at the center of the magnetic-field generating coils shown in FIG. 11 and then the phase $\theta'$ of the analogue electric signal, from the position detector 23, is measured at every tilt angle. Further, in the graph, the curves (h1), (h2), (h3), (h4), (h5) and (h6) indicate resultant phases $\theta'$ when the height of the pick-up coil 131 is changed at levels h1, h2, h3, h4, h5 and h6, respectively. These heights h1~h6 are as follows.

|  |
|---|
| h1 = 10 pitches |
| h2 = 20 pitches |
| h3 = 30 pitches |
| h4 = 34 pitches |
| h5 = 40 pitches |
| h6 = 50 pitches |

Where, 1 pitch equals 2.5 mm, as is seen from FIG. 6.

As is apparent from the graph of FIG. 14, when the height of the pick-up coil is selected to be h4=34 pitches (=75 mm), the variation of the phase $\theta'$ becomes substantially zero within the widest range of the tilt angle $\alpha$ ($-\frac{1}{4}\pi \sim +\frac{1}{4}\pi$), which means that the correct coordinate data reading can be expected regardless of the variation of the tilt angle. In such condition of h4=34 pitches, according to the experiment, the above mentioned phase-deviation ratio a is selected be a value of 1/30, where the unit of a is [radian/pitch]. To be more specific, when each pitch of the two adjacent conductors is selected to be 2.5 mm, the ratio a is equal to 1/30. Thus, it is known that the approximate equation ah$\approx$1 (equation (20)) can be satisfied, that is 1/30×34$\approx$1.

Figure 15:
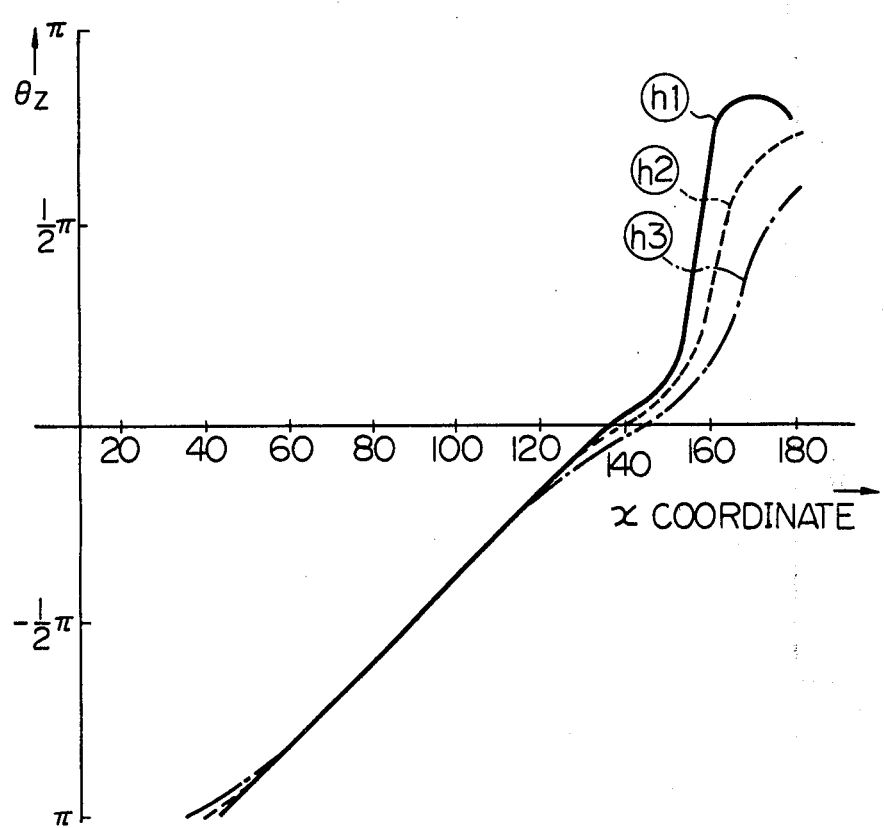
FIG. 15 is a graph illustrating a relationship between the x coordinate and the phase of the analogue electric signal, by using the magnetic-field generating coils shown in FIG. 11.

FIG. 15 is a graph indicating a relationship between the x coordinate and the phase of the analogue electric signal, by using the magnetic-field generating coils shown in FIG. 11. In this case, the position detector 23 is moved along the x coordinate axis, and the phase $\theta$ of the analogue electric signal, from the detector 23, is measured in each mode of the heights h1, h2 and h3 which correspond to curves (h1), (h2) and (h3) of the graph. Where, the heights are selected as follows.
h1=10 pitches
h2=20 pitches
h3=30 pitches
(1 pitch equals to 2.5 mm)
As seen from the graph, the curve (h3), when the height h3 is 30 pitches, provides very good linearity.

The above descriptions are made by taking as an example a case of a one-dimensional coordinate reading apparatus. However, a two-dimensional coordinate reading apparatus will also easily be constructed, when two sets of the magnetic-field generating coils are used, each having the same arrangement as shown in FIG. 11, and one of the two sets is set parallel to the x coordinate axis and the other thereof is set on the former set along the y coordinate axis. Such two-dimensional coordinate reading apparatus may most widely be utilized as the aforesaid graphic information processing system. Similarly, if three sets of the magnetic-field generating coils are used, a three-dimensional coordinate reading apparatus will be realized.

Figure 16:
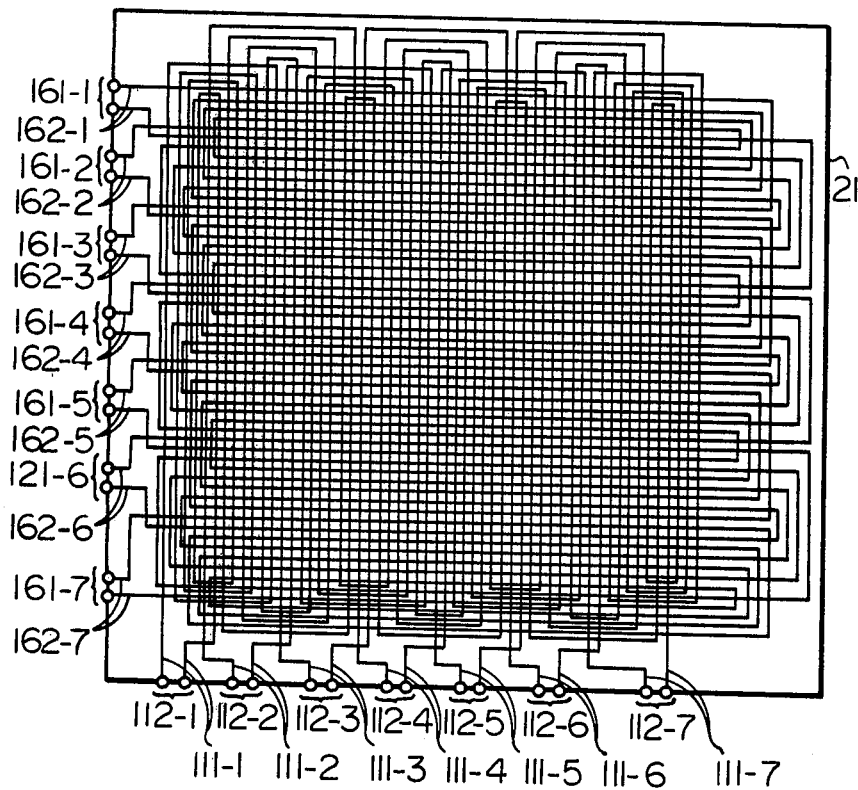
FIG. 16 is a diagram illustrating an arrangement of the magnetic-field generating coils used for constructing the two-dimensional coordinate reading apparatus.

FIG. 16 is a plan view illustrating an arrangement of the magnetic-field generating coils used for constructing the two-dimensional coordinate reading apparatus. The seven-phase x coordinate magnetic-field generating coils 111-1~111-7 and the x alternating signal sources 112-1~112-7, are identical to those shown in FIG. 11. In FIG. 16, the reference numerals 161-1~161-7 represent each of seven-phase y coordinate magnetic-field generating coils and the reference numerals 162-1~162-7 represent each of seven phase y alternating signal sources.

Figure 17:
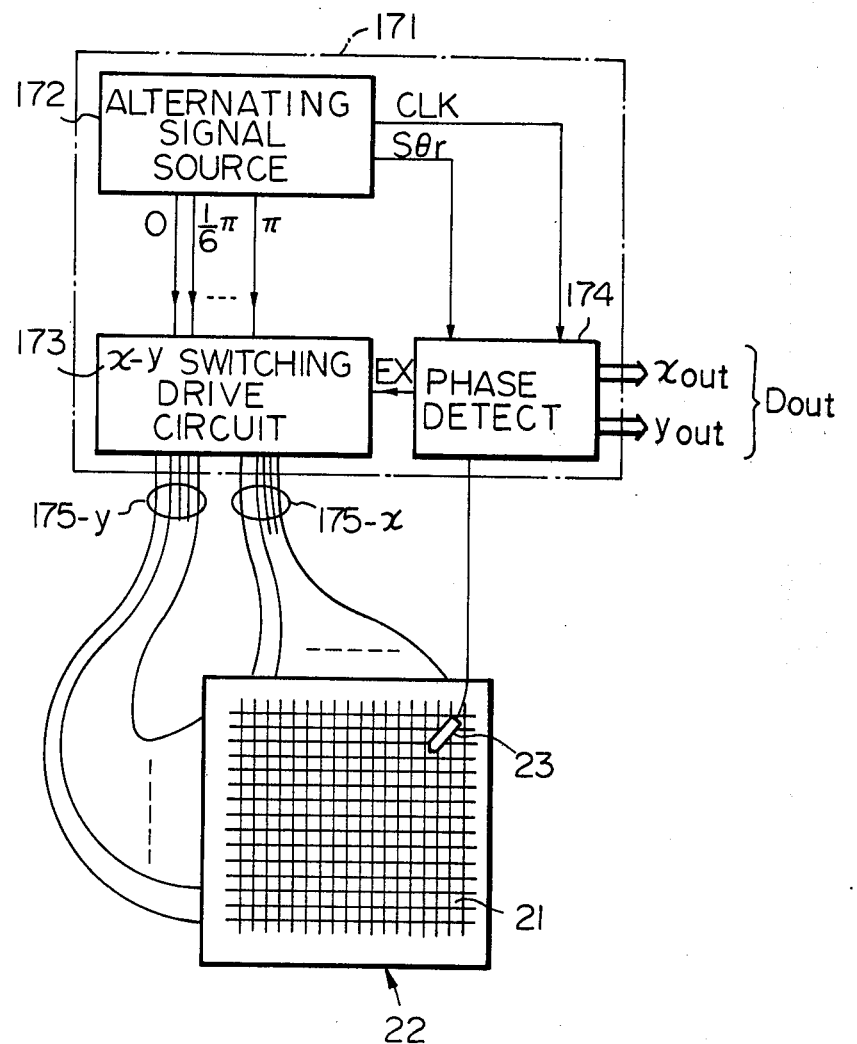
FIG. 17 is a block diagram of one example for constructing the two-dimensional coordinate reading apparatus according to the present invention.

FIG. 17 is a block diagram of one example for constructing the two-dimensional coordinate reading apparatus according to the present invention. In FIG. 17, a processing unit (corresponding to 24 in FIG. 2) includes therein, an alternating signal source 172 (corresponding to 24-2 in FIG. 2), an x-y switching drive circuit 173 (corresponding to 24-2 in FIG. 2) and a phase detector 174 (corresponding to 24-1 in FIG. 2). It should be understood that since FIG. 2 is a schematic view only for clarifying the principle of the present invention, the members of FIG. 2 are not exactly the same as those of FIG. 17 which illustrates actual members. Seven-phase alternating signals (0, 1/6$\pi$, 2/6$\pi$, 3/6$\pi$, 4/6$\pi$, 5/6$\pi$, $\pi$) are, first, applied to the x-y switching drive circuit 173 and then supplied to the magnetic-field generating equipment 22, via x-driving lines 175-x or y-driving lines 175-y. It should be understood that the magnetic-field generating equipment 22 has the same construction as shown in FIG. 16. The reference symbol CLK represents clock signals, similarly, S$\theta_r$ the reference phase signal and EX an x-y switching command signal. The x-y switching drive circuit 173 is necessary, because, if the x magnetic-field generating coils and the y magnetic-field generating coils are not switched to operate selectively, that is, if these x and y coils are driven at the same time, the above-mentioned cylindrical rotating magnetic fields cannot be expected to be formed due to the presence of magnetic interference therebetween.

Figure 18:
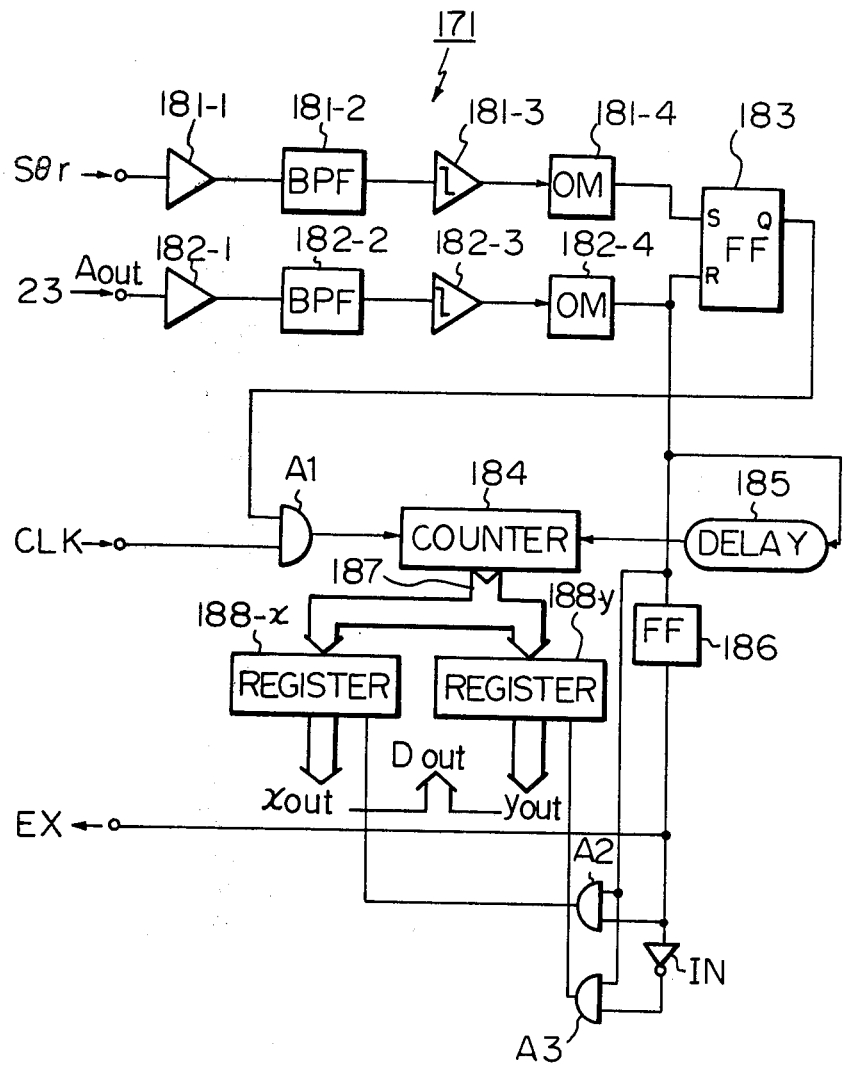
FIG. 18 is a block diagram of one example for constructing the processing unit 171 (except for the block 172) shown in FIG. 17.

FIG. 18 is a block diagram of one example for constructing the processing unit 171 (except for the block 172) shown in FIG. 17. In FIG. 18, the reference numeral 23, the reference symbols S$\theta_r$, CLK, EX, $x_{out}$, $y_{out}$ and $D_{out}$ are the same as those of FIG. 17. The operation is as follows. First, the predetermined reference phase signal S$\theta_r$ is applied to an amplifier 181-1 and triggers a one-shot multivibrator (OM) 181-4, via a band-pass filter (BPF) 181-2 and a comparator 181-3. Then a set-reset type flip.flop 183 is set and produces a Q output having the logic "1". The appearance of this Q output ("1") means that the reference phase (for example 0 radian) signal S$\theta_r$ appears. The Q output opens an AND gate A1, and the clock signals pass through the gate A1. Therefore, a 12-bit binary counter 184 starts counting the number of clock signals CLK. The counting operation, in the counter 184, is continued until the Q output of the flip.flop 183 changes from the logic "1" to "0" and the AND gate A1 is closed. The change of the Q output, from the logic "1" to "0", occurs when the flip.flop 183 receives, at its reset input R, a predetermined signal. To be more specific, the flip.flop 183 changes its status when the analogue electric signal $A_{out}$ from the position detector 23 passes through an amplifier 182-1, a band-pass filter (BPF) 182-2, a comparator 182-3 and a one-shot multivibrator (OM) 182-4. When the level of the analogue electric signal $A_{out}$ exceeds a threshold level at the comparator 182-3, the signal $A_{out}$ can trigger the one-shot multivibrator 182-4, which timing corresponds to the position at which the edge of the position detector 23 is now located, that is the x coordinate value, when an x scanning is operated or the y coordinate value, when a y scanning is operated, as shown in FIG. 15. The value of the phase $\theta$ corresponds to a term from the appearance of the reference phase signal S$\theta_r$ to the appearance of the analogue electric signal $A_{out}$, and also the value of the phase $\theta$ corresponds, in FIG. 18, to the number counted in the counter 184. Accordingly, the counted number (value of the phase $\theta$) in the counter 184 is stored, via a data bus 187, in an x-register 188-x (when the x scanning is operated) or in a y-register 188-y (when the y scanning is operated). It should be noted that the contents of the register 188-x indicates the x coordinate data $x_{out}$ and the contents of the register 188-y indicates the y coordinate data $y_{out}$. These data $x_{out}$ and $y_{out}$ make up the coordinate data to be read. It should be understood that the position detector includes therein a so-called pen switch which turns ON every time the position detector touches the tablet, where the analogue electric signal is effective only when the turn-on signal is produced therefrom. As mentioned above, when the analogue electric signal $A_{out}$ reaches the one-shot multivibrator 182-4, the AND gate A1 is closed. In this case, the contents of the counter 184 must be cleared, so as to make ready for receiving the next data therein. Thus, the counter 184 is reset after a very short time in which the contents of the counter 184 is completely transferred to the register (188-x or 188-y). In order to provide such a very short time, a delay circuit 185 is used.

The flip.flop (FF) 186 is in the logic "1" status during a process of the analogue electric signal $A_{out}$, for example the signal $A_{out}$ representing the x coordinate. That is, the logic of the x-y switching command signal EX is "1" and, accordingly, the x magnetic-field generating coils are energized. During this time, AND gates A2 and A3 are closed, because the multivibrator 182-4 applies its output signal of the logic "1" thereto. When the analogue electric signal $A_{out}$ appears at the multivibrator 182-4, the AND gate A2 is opened, and then the x-register 188-x is triggered. As a result, the contents $x_{out}$ is produced from the register 188-x. Immediately after this, the flip.flop 186 changes its status from the logic "1" to "0". At the same time, the logic of the x-y switching signal EX is changed from "1" to "0", which signal EX of the logic "0" commands that the y magnetic-field generating coils are energized. At this time, both AND gates A2 and A3 are closed, however, when the next analogue electric signal $A_{out}$ (regarding the y coordinate data) appears at the output of the multivibrator 182-4, the AND gate A3 is opened. Thus, the y-register 188-y is triggered and the contents $y_{out}$ is produced from the register 188-y. The reference symbol IN represents an inverter.

Figure 19:
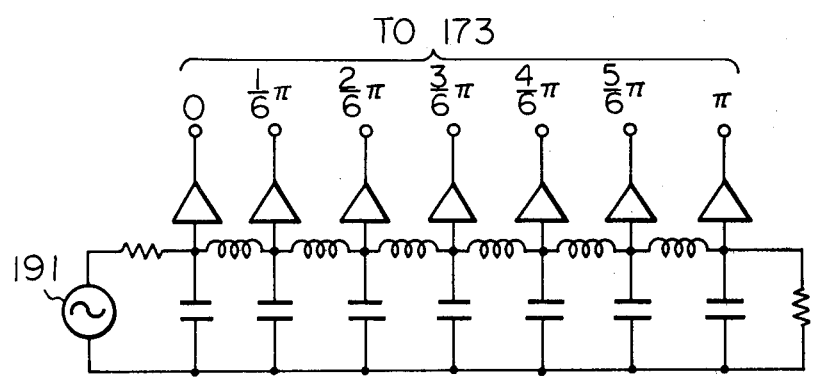
FIG. 19 is a circuit diagram of one example for constructing the alternating signal source 172 shown in FIG. 17, by using a publicly known analogue circuit.

The alternating signal source 172 can be made of a widely known analogue or digital circuit. FIG. 19 is one example of a circuit diagram for constructing the alternating signal source 172 shown in FIG. 17, by using a well known analogue circuit. In FIG. 19, an oscillator 191 produces an output signal of 1.2 kHz in frequency. Since the oscillator 191 cannot supply the high frequency clock signals CLK of FIG. 18, it is necessary to further employ another high frequency crystal oscillator.

Figure 20:
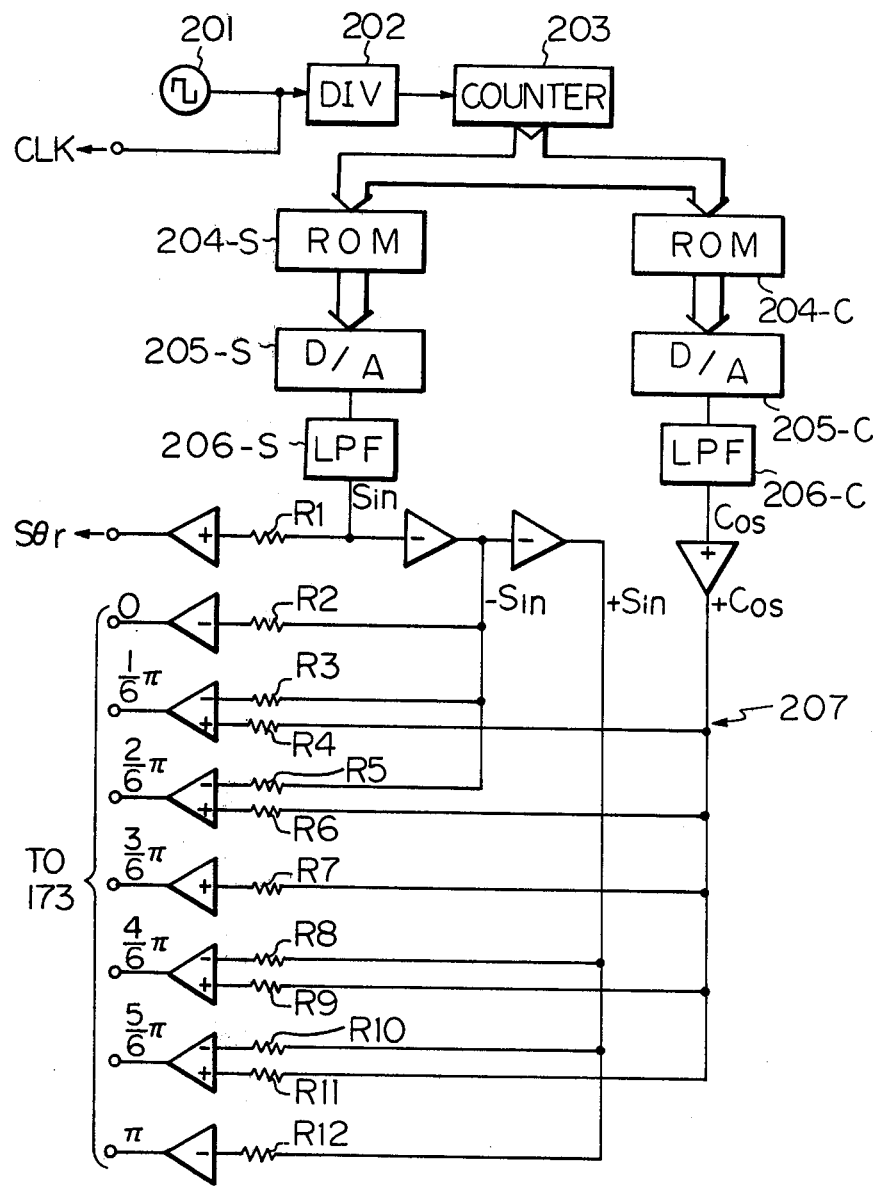
FIG. 20 is a circuit diagram of one example for constructing the alternating signal source 172 shown in FIG. 17, by using a publicly known digital circuit.

Contrary to the above, if the alternating signal source 172 of FIG. 17 is made of a digital circuit, it is not necessary to employ such a high frequency crystal oscillator, other than the oscillator 191, for the purpose of producing the clock signals CLK. This is because, in the digital circuit, a single high frequency crystal oscillator is able to function, on one hand, to produce the seven-phase alternating signals and, on the other hand, to produce the clock signals CLK, simultaneously. FIG. 20 is a circuit diagram of one example for constructing the alternating signal source 172 shown in FIG. 17, by using a well known digital circuit. In FIG. 20, the reference numeral 201 represents a crystal oscillator of, for example 16.38 MHz in frequency. In this case, the clock signals can be created by using the output itself of the oscillator 201. On the other hand, the output of the oscillator 201 is divided in frequency by a 1/16 frequency divider (DIV) 202, and the output of the divider 202 is counted by a 8-bit binary counter (COUNT) 203. The counter number in the counter 203 is applied, as an address signal, to read-only memories (ROM) 204-S and 204-C so as to access each of these memories. The memory 204-S functions as a sine wave (sin) generator and the memory 204-C functions as a cosine wave (cos) generator. The outputs therefrom are, respectively applied to 8-bit digital to analogue converters (D/A) 205-S and 205-C and converted into analogue signals. These analogue signals are, respectively applied to a circuit 207 for executing an addition and substraction process, via low-pass filters (LPF) 206-S and 206-C, each having a cut-off frequency of 8 kHz. In this figure, circuits, symbolized by "+", represent addition circuits, circuits, symbolized by "−", represent polarity inverting circuits, and circuits, symbolized by both "+" and "−", represent circuits for executing the addition and substraction operation.

Generally, a rotating vector R can be expressed by an equation of $R = A \sin \gamma + B \cos \gamma$. Accordingly, if the values of the coefficients A and B are suitably selected, seven-phase rotating vectors R, having the phase of 0, $1/6\pi$, $2/6\pi$ ..., $\pi$, respectively, that is the aforesaid seven-phase alternating signals can be obtained. Therefore, attenuators R1, R2 ..., R12 are used for the purpose of suitably determining the values of the coefficients A and B.

Figure 21:
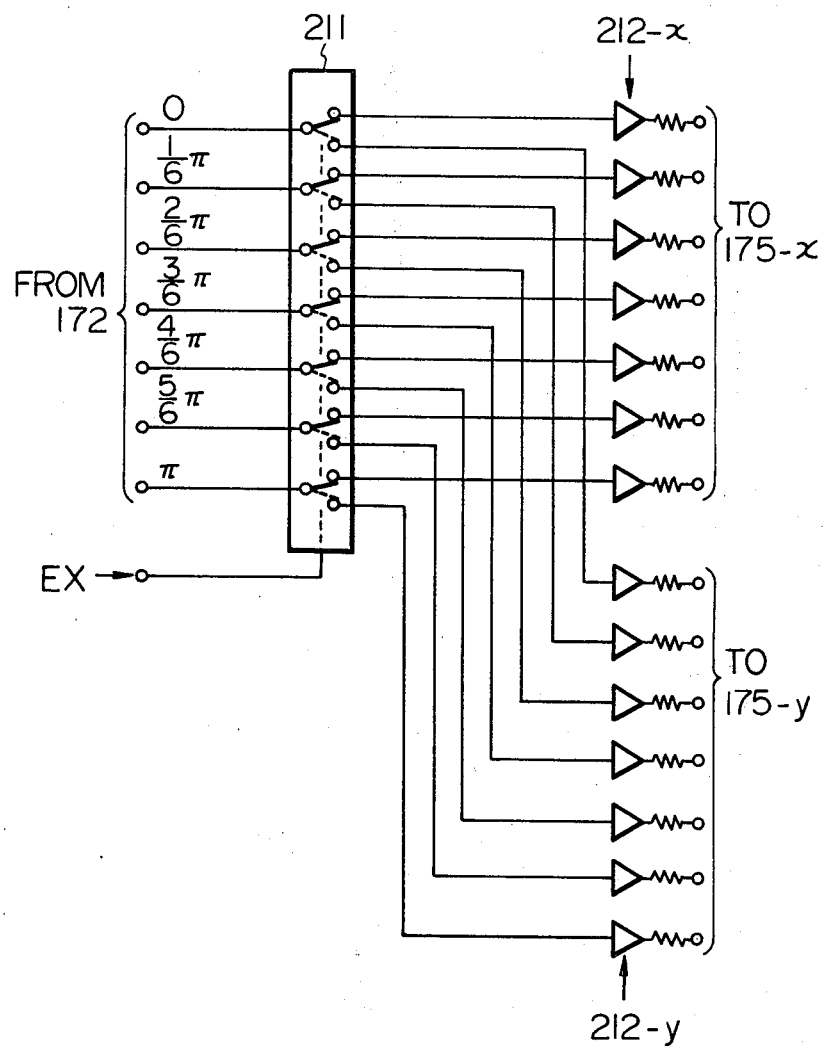
FIG. 21 is a circuit diagram of one example for constructing the x-y switching drive circuit 173 shown in FIG. 17.

FIG. 21 is one example of a circuit diagram for constructing the x-y switching drive circuit 173 shown in FIG. 17. In FIG. 21, the seven-phase alternating signals (0, $1/6\pi$, $2/6\pi$ ..., $\pi$) from the alternating signal source 172 (FIG. 17) are supplied to a circuit 212-x for driving the x magnetic-field generating coils or a circuit 212-y for driving the y magnetic-field generating coils selectively, by means of an analogue switch 211. The aforesaid x-y switching command signal EX determines that to which the seven-phase alternating signals should be supplied, that is, to the circuit 212-x or 212-y. The circuits 212-x and 212-y are connected, respectively to the x-drive lines 175-x and the y-drive lines 175-y shown in FIG. 17.

As explained above in detail, the coordinate reading apparatus according to the present invention can overcome the previously mentioned first and second defects and also can solve the previously mentioned problem.

I claim:

1. A coordinate reading apparatus, comprising;
a tablet including therein magnetic-field generating coils;
a position detector, responsive to magnetic fields induced by said magnetic-field generating coils, for generating an analogue electric signal corresponding to a desired position to be read on said tablet; and
a processing unit, operatively connected to said position detector and said tablet, for receiving said analogue electric signal from said position detector, for generating coordinate data corresponding to said desired position to be read on said tablet, and for supplying alternating signals to said magnetic-field generating coils, the phases of the respective alternating signals in each coil being shifted with respect to each other, each coil having a magnetic field component which when summed with the magnetic field component of an adjacent coil produces a rotating magnetic-field vector, and said position detector sensing the rotating magnetic-field vector which is comprised of the magnetic field components induced above said table, thereby the coordinate data to be read is generated by said processing unit by applying thereto the analogue electric signal representing said rotating magnetic-field vector comprising the magnetic-field components.

2. An apparatus as set forth in claim 1, wherein each of said magnetic-field generating coils has a plurality of turns and these turns are wound in a spiral like shape, and a part of turns of one magnetic-field generating coil, along one coordinate axis, are introduced between a part of the turns of another adjacent magnetic-field generating coil, along the same coordinate axis.

3. An apparatus as set forth in claim 2, wherein each said turn of each of said magnetic-field generating coils is formed in a rectangular shape and each of said magnetic-field coils is formed, as a whole, in a flat-plane like coil.

4. An apparatus as set forth in claim 2, wherein said magnetic-field generating coils comprise at least three magnetic-field generating coils and are electrically insulated from each other.

5. An apparatus as set forth in claim 4, wherein a through hole is created at each crossover point between said turns so as to bypass the crossover point.

6. An apparatus as set forth in claim 4, wherein a thin insulation layer is inserted between each two adjacent magnetic-field generating coils.

7. An apparatus as set forth in claim 1, wherein a pick-up coil is included in said position detector and operatively connected to said processing unit, the pick-up coil is sensitive to a vector signal of said rotating magnetic-field vector, oriented in one predetermined direction, of said rotating magnetic-field and generates said analogue electric signal therefrom.

8. An apparatus as set forth in claim 7, wherein said pick-up coil is located, at a height of h, above said tablet.

9. An apparatus as set forth in claim 8, wherein the height h is determined by a value satisfying an equation of $$f(h) + ah \sin_\alpha - f(h \cos_\alpha) - \alpha = 0$$

where, $\alpha$ (radians) denotes a tilt angle of said position detector with respect to a vertical axis of said tablet, a denotes a phase-deviation ratio $(d\theta/dx)$ which is defined by a variation in phase $(d\theta)$ of said analogue electric signal with respect to a variation of a movement $(dx)$ during a movement of said position detector along the coordinate axis.

10. An apparatus as set forth in claim 9, wherein said height h is the approximate value which satisfies the equation of $ah=1$.

11. An apparatus as set forth in claim 1, wherein said position detector has an edge, and wherein said processing unit comprises:
an alternating signal source, operatively connected to said tablet, for generating n-alternating signals simultaneously which have substantially an identical phase difference between each other, where n is a positive integer greater than or equal to 3; and
a phase detector, operatively connected to said position detector, for detecting a difference between the phase of said analogue electric signal and a predetermined reference phase signal, thereby the phase detector generates the coordinate data corresponding to the position at which the edge of said position detector is located on said tablet.

12. An apparatus as set forth in claim 11, wherein said magnetic-field generating coils comprise:
x coordinate magnetic-field generating coils arranged in one direction and operatively connected to said processing unit; and
y coordinate magnetic-field generating coils arranged in another direction perpendicular to said direction and operatively connected to said processing unit; and
wherein said processing unit further includes therein an x-y coordinate switching drive circuit, operatively connected to said alternating signal source and to said phase detector, including x and y coordinate driving systems operatively connected to said x and y coordinate magnetic-field generating coils, respectively, said x-y coordinate switching drive circuit distributes said alternating signals into the x coordinate driving system and the y coordinate driving system alternately, so that said alternating signal source and said phase detector are driven in an x-scanning mode and a y-scanning mode alternately, thereby two-dimensional coordinate data, comprising both x-coordinate data and y-coordinate data, is generated.

13. An apparatus as set forth in claim 11 or 12, wherein said alternating signal source generates clock signals and the predetermined reference phase signal, and wherein said phase detector comprises a counter, operatively connected to said position detector and said alternating signal source, for counting a number of clock signals, the clock signals are counted by the counter from a time when the predetermined reference phase signal is received, until said analogue electric signal, having a level exceeding a predetermined threshold level, is received.

14. An apparatus as set forth in claim 13, wherein said phase detector further comprises an x-register and y-register, both operatively connected to said counter, for storing an output from said counter.

15. An apparatus as set forth in claim 12,
wherein said processing unit further comprises a flip flop, operatively connected to said position detector and said x-y switching drive circuit, for generating an x-y switching command signal;
wherein said x-y switching drive circuit conducts an x-y switching drive operation in dependence upon the x-y switching command signal;
wherein the x-y switching command signal is generated as an alternative logic first or second signal generated by said flip flop; and
wherein said flip flop is sequentially set and reset every time said analogue electric signal, having a level exceeding the predetermined threshold level occurs.

* * * * *

UNITED STATES PATENT AND TRADEMARK OFFICE
CERTIFICATE OF CORRECTION

PATENT NO. : 4,418,242

DATED : November 29, 1983

INVENTOR(S) : TSUTOM KOUNO

It is certified that error appears in the above-identified patent and that said Letters Patent is hereby corrected as shown below:

On the title page;

(30) "Mar. 4, 1980" should be --Mar. 3, 1980--.

Column 2, line 13, "view point" should be --viewpoint--.

Column 4, line 30, "this" should be --that--.

Column 5, line 11, "$\pi$" should be --$\omega$--.

Column 6, line 37, "denotes" should be --denote--;
line 42, "H" should be --$\dot{H}$--;
line 43, "H" should be --$\dot{H}$--;
line 52, "$U_m$" should be --$\dot{U}_m$--;
line 53, "$x^m$" should be --$\dot{x}^m$--; "z" should be --$\dot{z}$--.

Column 8, line 27, "H" should be --$\dot{H}$--;
line 45, "in to" should be --into--.

Column 9, line 14, "6," should be --6;--;
line 17, "conductors," should be --conductors;--;
line 19, after "fourthly" insert --,--.

Column 10, line 27, "axises" should be --axes--;
line 39, "-fiel" should be --field--.

UNITED STATES PATENT AND TRADEMARK OFFICE
CERTIFICATE OF CORRECTION

PATENT NO. : 4,418,242           Page 2 of 2

DATED : November 29, 1983

INVENTOR(S) : TSUTOM KOUNO

It is certified that error appears in the above-identified patent and that said Letters Patent is hereby corrected as shown below:

Column 11, line 4, "1," should be --$\hat{\ell}$,--;
line 5, "(1/4)" should be --($\hat{\ell}$/4)--;
line 7, "(1/4)" should be --($\hat{\ell}$/4)--;
line 50, "B" should be --$\dot{B}$--;
line 51, "$B_p2$" should be --$\dot{B}_p2$--;
line 59, "H" should be --$\dot{H}$--.

Column 12, line 39, "simply" should be --simplify--.

Column 14, line 24, "H" should be --$\dot{H}$--.

Column 15, line 66, "vaires" should be --varies--.

Column 16, line 15, "view point" should be --viewpoint--;
line 19, "H131" should be --$\dot{H}$131--.

Column 20, line 23, "R" should be --$\dot{R}$--;
line 24, "R" should be --$\dot{R}$--;
line 26, "R" should be --$\dot{R}$--.

Signed and Sealed this

Second Day of July 1985

[SEAL]

Attest:

DONALD J. QUIGG

Attesting Officer    Acting Commissioner of Patents and Trademarks